US012754622B2

(12) United States Patent
Zhang et al.

(10) Patent No.: US 12,754,622 B2
(45) Date of Patent: Oct. 6, 2026

(54) INFORMATION TRANSMISSION METHOD, AND APPARATUS

(71) Applicant: Honor Device Co., Ltd., Shenzhen (CN)

(72) Inventors: Beihang Zhang, Shenzhen (CN); Hang Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 250 days.

(21) Appl. No.: 18/727,843

(22) PCT Filed: Dec. 20, 2022

(86) PCT No.: PCT/CN2022/140474
§ 371 (c)(1),
(2) Date: Jul. 10, 2024

(87) PCT Pub. No.: WO2023/134408
PCT Pub. Date: Jul. 20, 2023

(65) Prior Publication Data

US 2026/0186588 A1 Jul. 2, 2026

(30) Foreign Application Priority Data

Jan. 11, 2022 (CN) ......................... 202210028942.5

(51) Int. Cl.
*G06F 3/0354* (2013.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/04146* (2019.05); *G06F 3/04162* (2019.05)

(58) Field of Classification Search
None
See application file for complete search history.

(56) References Cited

U.S. PATENT DOCUMENTS 9,851,816 B2 * 12/2017 Chang .................. G06F 3/0441
10,042,439 B2 8/2018 Varlamov et al.
(Continued)

FOREIGN PATENT DOCUMENTS

CN 107003742 A 8/2017
CN 107357472 A 11/2017
(Continued)

*Primary Examiner* — Krishna P Neupane
(74) *Attorney, Agent, or Firm* — Leydig, Voit & Mayer, Ltd.

(57) ABSTRACT

Transmitting information to an electronic device when a stylus has no Bluetooth module is disclosed. A first electrode sends N first signals corresponding to N sending moments based on a refresh rate, and N is an integer ≥1. A second electrode sends M second signals corresponding to M sending moments based on a pressure sensing value detected by the stylus or a type of an operation performed by a user on the stylus. The M sending moments overlap some or all of the N sending moments, and M is an integer ≤N. The electronic device receives the first and second signals, and obtains target coding data based on the first value and/or the second value recorded at the N moments, where the target coding data is used to represent the pressure sensing value or the type of the operation performed by the user on the stylus.

20 Claims, 21 Drawing Sheets

(56) References Cited

U.S. PATENT DOCUMENTS

| | | | |
|---|---|---|---|
| 11,204,671 B2 | 12/2021 | Yang et al. | |
| 11,379,059 B2 | 7/2022 | He et al. | |
| 11,537,221 B2 | 12/2022 | Bakken et al. | |
| 12,050,739 B2 | 7/2024 | Xi et al. | |
| 2017/0060276 A1 | 3/2017 | Qiao et al. | |
| 2018/0196574 A1 | 7/2018 | Case, Jr. et al. | |
| 2022/0011883 A1* | 1/2022 | Chen | G06F 3/04162 |
| 2022/0334701 A1* | 10/2022 | Cheng | G06F 3/0441 |

FOREIGN PATENT DOCUMENTS

| | | | |
|---|---|---|---|
| CN | 110737342 | A | 1/2020 |
| CN | 110968208 | A | 4/2020 |
| CN | 112558798 | A | 3/2021 |
| CN | 113138680 | A | 7/2021 |
| CN | 113220154 | A | 8/2021 |
| CN | 113238649 | A | 8/2021 |
| CN | 113268175 | A | 8/2021 |
| CN | 113821113 | A | 12/2021 |
| WO | 2020140947 | A1 | 7/2020 |

* cited by examiner (a)

(b)

(a)

(b)

INFORMATION TRANSMISSION METHOD, AND APPARATUS

CROSS-REFERENCE TO RELATED APPLICATIONS

This application is a national stage of International Application No. PCT/CN2022/140474, filed on Dec. 20, 2022, which claims priority to Chinese Patent Application No. 202210028942.5, filed on Jan. 11, 2022. The disclosures of both of the aforementioned applications are hereby incorporated by reference in their entireties.

TECHNICAL FIELD

This application relates to the field of terminals, and in particular, to an information transmission method and an apparatus.

BACKGROUND

A stylus (stylus pen) is a common accessory for an electronic device such as a tablet, a mobile phone, or a portable computer. With the stylus, a user can perform input on the electronic device more easily. In a scenario such as painting or drawing, the stylus can provide an experience similar to that of a real pen. The stylus generally has a pressure sensing component. Through contact between a front pen tip and a screen, a force applied to the pen is transmitted to the pressure sensing component inside a pen body through the pen tip. The pressure sensing component senses the force and calculates a pressure sensing value. The electronic device can draw, based on different pressure sensing values, lines of varying thicknesses that match the pressure sensing values.

In a possible design, the stylus can transmit a pressure sensing level to the electronic device through a Bluetooth channel. However, some styluses may have no Bluetooth module and cannot transmit pressure sensing values. In another possible design, a pressure sensing value can be transmitted by performing frequency modulation on an electrode of the pen tip. For example, for a pressure sensing level of a, an emitter electrode of the pen tip has a frequency of fa, and for a pressure sensing level of b, the emitter electrode of the pen tip has a frequency of fb. A frequency modulation component on the electronic device detects a frequency, and then a pressure sensing level to be transmitted by the pen can be obtained based on a mapping table. However, this requires adding an additional frequency modulation circuit to the stylus and adding a multi-frequency detection circuit to the electronic device, which increases design complexity of circuits of the pen and the electronic device.

SUMMARY

This application provides an information transmission method and an apparatus, to transmit information (for example, a pressure sensing value) to an electronic device when a stylus has no Bluetooth module and device complexity is not increased.

To achieve the foregoing objective, the following technical solutions are used in embodiments of this application.

According to a first aspect, an information transmission method is provided and applied to a system including a stylus and an electronic device. The stylus includes a first electrode and a second electrode. The method includes: The first electrode sends N first signals based on a refresh rate, where the N first signals correspond to N sending moments, and N is an integer greater than or equal to 1. The second electrode sends M second signals based on a pressure sensing value detected by the stylus or a type of an operation performed by a user on the stylus, where the M second signals correspond to M sending moments, the M sending moments overlap some or all of the N sending moments, and M is an integer less than or equal to N. The electronic device receives the first signal and the second signal. At a first moment, if the electronic device determines that the first signal exists but the second signal does not exist, a first value is recorded; and at a second moment, if the electronic device determines that the first signal exists and the second signal exists, a second value is recorded, where the first moment or the second moment is any moment in the N moments. The electronic device obtains target coding data based on the first value and/or the second value recorded at the N moments, where the target coding data is used to represent the pressure sensing value or the type of the operation performed by the user on the stylus.

According to the method provided in this embodiment of this application, the first electrode sends the N first signals based on the refresh rate, and the second electrode sends the M second signals based on the pressure sensing value detected by the stylus or the type of the operation performed by the user on the stylus. The N first signals correspond to the N sending moments, the M second signals correspond to the M sending moments, and the M sending moments overlap some or all of the N sending moments. That is, a time sequence of the electrode signals sent by TX1 of the stylus may be used as a reference to change a time sequence of the electrode signals of TX2 of the stylus, to transmit, through existence or absence of the electrode signals sent by TX2, the pressure sensing value or the type of the operation performed by the user on the stylus. At the first moment, if the electronic device determines that the first signal exists but the second signal does not exist, the first value is recorded; and at the second moment, if the electronic device determines that the first signal exists and the second signal exists, the second value is recorded, where the first moment or the second moment is any moment in the N moments. The electronic device obtains the target coding data based on the first value and/or the second value recorded at the N moments, and determines, based on the target coding data, the pressure sensing value or the type of the operation performed by the user on the stylus. In this way, the pressure sensing value can be transmitted to the electronic device when the stylus has no Bluetooth module and device complexity is not increased, making transmission of the pressure sensing value more convenient and simpler.

In a possible design, the target coding data includes the first value and/or the second value recorded at all of the N moments; or the target coding data includes the first value and/or the second value recorded at some of the N moments.

In a possible design, the first value is 0, and the second value is 1; or the first value is 1, and the second value is 0. For example, if the electrode signal (the first signal) of TX1 (the first electrode) exists but the electrode signal (the second signal) of TX2 (the second electrode) does not exist at a first moment, the electrode signal corresponding to TX2 at the first moment is marked as 0; and if the electrode signal of TX1 exists and the electrode signal of TX2 exists at a second moment, the electrode signal corresponding to TX2 at the second moment is marked as 1. Alternatively, if the electrode signal of TX1 exists but the electrode signal of TX2 does not exist at the first moment, the electrode signal corresponding to TX2 at the first moment is marked as 1; and if the electrode signal of TX1 exists and the electrode signal of TX2 exists at the second moment, the electrode signal corresponding to TX2 at the second moment is marked as 0.

In a possible design, the target coding data is binary data, the binary data includes N bits or N-Q bits, and Q is an integer less than N and greater than 0. For example, if N is 10, the binary data may be 10 bits or less than 10 bits.

In a possible design, a value range of the pressure sensing value is 0 to $2^N$ or 0 to $2^{N-Q}$. For example, if N is equal to 10, a maximum value range of the pressure sensing value may be 0 to $2^{10}$, that is, 0 to 1024. If N is equal to 11, a maximum value range of the pressure sensing value may be 0 to $2^{11}$, that is, 0 to 2048.

In a possible design, when a value of first P bits of the binary data is a first preset value, last N-P bits of the binary data are used to indicate the pressure sensing value, and P is an integer greater than or equal to 1; or when the value of the first P bits of the binary data is a second preset value, the last N-P bits of the binary data are used to indicate the type of the operation performed by the user. P is preset and may be, for example, 1, 2, or 3. For example, if P is 2, when the value of the first P bits is 01, the last N-P bits of the binary data are used to indicate the pressure sensing value, or when the value of the first P bits is 10, the last N-P bits of the binary data are used to indicate the type of the operation performed by the user.

In a possible design, when a value of last P bits of the binary data is a first preset value, first N-P bits of the binary data are used to indicate the pressure sensing value, and P is an integer greater than or equal to 1; or when the value of the last P bits of the binary data is a second preset value, the first N-P bits of the binary data are used to indicate the type of the operation performed by the user. For example, if P is 2, when the value of the last P bits is 01, the first N-P bits of the binary data are used to indicate the pressure sensing value, or when the value of the first P bits is 10, the first N-P bits of the binary data are used to indicate the type of the operation performed by the user.

In a possible design, the type of the operation performed by the user on the stylus includes an operation performed on a button or a touch area of the stylus, and the operation performed on the button or the touch area of the stylus includes single-tapping, double-tapping, long-pressing, or sliding.

In a possible design, when the target coding data is used to represent the pressure sensing value, the method further includes: The electronic device determines, based on the pressure sensing value, a thickness of a line drawn by the stylus. When the pressure sensing value is larger, the line is thicker, and when the pressure sensing value is smaller, the line is thinner.

In a possible design, when the target coding data is used to represent the type of the operation performed by the user on the stylus, the method further includes: The electronic device takes a screenshot when the type of the operation is single-tapping the button; the electronic device starts a notepad application when the type of the operation is long-pressing the button; or the electronic device switches an interface when the type of the operation is sliding in the touch area.

In a possible design, the method further includes: In response to an operation of selecting an accessibility option in a setting interface of the electronic device by the user, the electronic device displays an accessibility interface, where the accessibility interface includes a stylus option. In response to an operation of selecting the stylus option by the user, the electronic device displays a stylus function setting interface, where the stylus function setting interface includes a pressure sensing level option. In response to an operation performed by the user on the pressure sensing level option, the electronic device displays a pop-up box, where the pop-up box includes numerical values of a plurality of pressure sensing levels. In response to an operation of selecting a first numerical value from the numerical values of the plurality of pressure sensing levels by the user, the electronic device sets a pressure sensing level of the stylus based on the first numerical value. In this way, the user can manually set the pressure sensing level of the stylus.

In a possible design, in response to an operation of selecting an accessibility option in a setting interface of the electronic device by the user, the electronic device displays an accessibility interface, where the accessibility interface includes a stylus option. In response to an operation of selecting the stylus option by the user, the electronic device displays a stylus function setting interface, where the stylus function setting interface includes a numerical value adjustment box and a numerical value adjustment button that correspond to a pressure sensing level. In response to an operation of adjusting the numerical value adjustment box to a first numerical value through the numerical value adjustment button by the user, the electronic device sets a pressure sensing level of the stylus based on the first numerical value. In this way, the user can manually set the pressure sensing level of the stylus.

According to a second aspect, an information transmission method is provided and applied to a stylus. The stylus includes a first electrode and a second electrode. The method includes: The first electrode sends N first signals to an electronic device based on a refresh rate, where the N first signals correspond to N sending moments, and N is an integer greater than or equal to 1. The second electrode sends M second signals based on a pressure sensing value detected by the stylus or a type of an operation performed by a user on the stylus, where the M second signals correspond to M sending moments, the M sending moments overlap some or all of the N sending moments, and M is an integer less than or equal to N. A first moment of the N moments corresponds to a first value, and the first signal exists but the second signal does not exist at the first moment; a second moment of the N moments corresponds to a second value, and the first signal exists and the second signal exists at the second moment; and the first value and/or the second value corresponding to the N moments are used to construct target coding data, and the target coding data is used to represent the pressure sensing value or the type of the operation performed by the user on the stylus.

According to the method provided in this embodiment of this application, the first electrode sends the N first signals based on the refresh rate, and the second electrode sends the M second signals based on the pressure sensing value detected by the stylus or the type of the operation performed by the user on the stylus. The N first signals correspond to the N sending moments, the M second signals correspond to the M sending moments, and the M sending moments overlap some or all of the N sending moments. That is, a time sequence of the electrode signals sent by TX1 of the stylus may be used as a reference to change a time sequence of the electrode signals of TX2 of the stylus, to transmit, through existence or absence of the electrode signals sent by TX2, the pressure sensing value or the type of the operation performed by the user on the stylus. In this way, the pressure sensing value can be transmitted to the electronic device when the stylus has no Bluetooth module and device complexity is not increased, making transmission of the pressure sensing value more convenient and simpler.

In a possible design, the target coding data includes the first value and/or the second value corresponding to all of the N moments; or the target coding data includes the first value and/or the second value corresponding to some of the N moments.

In a possible design, the first value is 0, and the second value is 1; or the first value is 1, and the second value is 0.

In a possible design, the target coding data is binary data, the binary data includes N bits or N-Q bits, and Q is an integer less than N and greater than 0.

In a possible design, a value range of the pressure sensing value is 0 to $2^N$ or 0 to $2^{N-Q}$.

In a possible design, when a value of first P bits of the binary data is a first preset value, last N-P bits of the binary data are used to indicate the pressure sensing value, and P is an integer greater than or equal to 1; or when the value of the first P bits of the binary data is a second preset value, the last N-P bits of the binary data are used to indicate the type of the operation performed by the user.

In a possible design, when a value of last P bits of the binary data is a first preset value, first N-P bits of the binary data are used to indicate the pressure sensing value, and P is an integer greater than or equal to 1; or when the value of the last P bits of the binary data is a second preset value, the first N-P bits of the binary data are used to indicate the type of the operation performed by the user.

In a possible design, the type of the operation performed by the user on the stylus includes an operation performed on a button or a touch area of the stylus, and the operation performed on the button or the touch area of the stylus includes single-tapping, double-tapping, long-pressing, or sliding.

According to a third aspect, an information transmission method is provided and applied to an electronic device. The method includes: The electronic device receives N first signals from a first electrode of a stylus and M second signals from a second electrode of the stylus, where N is an integer greater than or equal to 1, and M is an integer less than or equal to N. At a first moment, if the electronic device determines that the first signal exists but the second signal does not exist, a first value is recorded; and at a second moment, if the electronic device determines that the first signal exists and the second signal exists, a second value is recorded, where the first moment or the second moment is any moment in the N moments. The electronic device obtains target coding data based on the first value and/or the second value recorded at the N moments, where the target coding data is used to represent the pressure sensing value or the type of the operation performed by the user on the stylus.

According to the method provided in this embodiment of this application, the electronic device receives the N first signals from the first electrode of the stylus and the M second signals from the second electrode of the stylus. At the first moment, if the electronic device determines that the first signal exists but the second signal does not exist, the first value is recorded; and at the second moment, if the electronic device determines that the first signal exists and the second signal exists, the second value is recorded, where the first moment or the second moment is any moment in the N moments. The electronic device obtains the target coding data based on the first value and/or the second value recorded at the N moments, and determines, based on the target coding data, the pressure sensing value or the type of the operation performed by the user on the stylus. In this way, the pressure sensing value can be transmitted to the electronic device when the stylus has no Bluetooth module and device complexity is not increased, making transmission of the pressure sensing value more convenient and simpler.

In a possible design, the target coding data includes the first value and/or the second value recorded at all of the N moments; or the target coding data includes the first value and/or the second value recorded at some of the N moments.

In a possible design, the first value is 0, and the second value is 1; or the first value is 1, and the second value is 0.

In a possible design, the target coding data is binary data, the binary data includes N bits or N-Q bits, and Q is an integer less than N and greater than 0.

In a possible design, a value range of the pressure sensing value is 0 to $2^N$ or 0 to $2^{N-Q}$.

In a possible design, when a value of first P bits of the binary data is a first preset value, last N-P bits of the binary data are used to indicate the pressure sensing value, and P is an integer greater than or equal to 1; or when the value of the first P bits of the binary data is a second preset value, the last N-P bits of the binary data are used to indicate the type of the operation performed by the user.

In a possible design, when a value of last P bits of the binary data is a first preset value, first N-P bits of the binary data are used to indicate the pressure sensing value, and P is an integer greater than or equal to 1; or when the value of the last P bits of the binary data is a second preset value, the first N-P bits of the binary data are used to indicate the type of the operation performed by the user.

In a possible design, the type of the operation performed by the user on the stylus includes an operation performed on a button or a touch area of the stylus, and the operation performed on the button or the touch area of the stylus includes single-tapping, double-tapping, long-pressing, or sliding.

In a possible design, when the target coding data is used to represent the pressure sensing value, the method further includes: The electronic device determines, based on the pressure sensing value, a thickness of a line drawn by the stylus. When the pressure sensing value is larger, the line is thicker, and when the pressure sensing value is smaller, the line is thinner.

In a possible design, when the target coding data is used to represent the type of the operation performed by the user on the stylus, the method further includes: The electronic device takes a screenshot when the type of the operation is single-tapping the button; the electronic device starts a notepad application when the type of the operation is long-pressing the button; or the electronic device switches an interface when the type of the operation is sliding in the touch area.

In a possible design, the method further includes: In response to an operation of selecting an accessibility option in a setting interface of the electronic device by the user, the electronic device displays an accessibility interface, where the accessibility interface includes a stylus option. In response to an operation of selecting the stylus option by the user, the electronic device displays a stylus function setting interface, where the stylus function setting interface includes a pressure sensing level option. In response to an operation performed by the user on the pressure sensing level option, the electronic device displays a pop-up box, where the pop-up box includes numerical values of a plurality of pressure sensing levels. In response to an operation of selecting a first numerical value from the numerical values of the plurality of pressure sensing levels by the user, the electronic device sets a pressure sensing level of the stylus based on the first numerical value.

In a possible design, in response to an operation of selecting an accessibility option in a setting interface of the electronic device by the user, the electronic device displays an accessibility interface, where the accessibility interface includes a stylus option. In response to an operation of selecting the stylus option by the user, the electronic device displays a stylus function setting interface, where the stylus function setting interface includes a numerical value adjustment box and a numerical value adjustment button that correspond to a pressure sensing level. In response to an operation of adjusting the numerical value adjustment box to a first numerical value through the numerical value adjustment button by the user, the electronic device sets a pressure sensing level of the stylus based on the first numerical value.

According to a fourth aspect, an embodiment of this application provides a stylus, including a processor and a memory. The memory stores computer-executable instructions, and the processor executes the computer-executable instructions stored in the memory, to enable the processor to perform the method according to the second aspect.

According to a fifth aspect, an embodiment of this application provides an electronic device, including a processor and a memory. The memory stores computer-executable instructions, and the processor executes the computer-executable instructions stored in the memory, to enable the processor to perform the method according to the third aspect.

According to a sixth aspect, an embodiment of this application provides a signal synchronization system, including the stylus according to the fourth aspect and the electronic device according to the fifth aspect.

According to a seventh aspect, an embodiment of this application provides a computer program product including instructions. When the computer program product is run on a computer, the computer is enabled to perform the method according to the second aspect or the third aspect.

According to an eighth aspect, an embodiment of this application provides a computer-readable storage medium. The computer-readable storage medium stores instructions. When the instructions are run on a computer, the computer is enabled to perform the method according to the second aspect or the third aspect.

For beneficial effects of the possible implementations of the second aspect to the eighth aspect, refer to the beneficial effects brought by the first aspect and the possible implementations of the first aspect. Details are not described herein again.

According to the method provided in embodiments of this application, a first electrode sends N first signals based on a refresh rate, and a second electrode sends M second signals based on a pressure sensing value detected by a stylus or a type of an operation performed by a user on the stylus. The N first signals correspond to N sending moments, the M second signals correspond to M sending moments, and the M sending moments overlap some or all of the N sending moments. That is, a time sequence of the electrode signals sent by TX1 of the stylus may be used as a reference to change a time sequence of the electrode signals of TX2 of the stylus, to transmit, through existence or absence of the electrode signals sent by TX2, the pressure sensing value or the type of the operation performed by the user on the stylus. At a first moment, if an electronic device determines that the first signal exists but the second signal does not exist, a first value is recorded; and at a second moment, if the electronic device determines that the first signal exists and the second signal exists, a second value is recorded, where the first moment or the second moment is any moment in the N moments. The electronic device obtains target coding data based on the first value and/or the second value recorded at the N moments, and determines, based on the target coding data, the pressure sensing value or the type of the operation performed by the user on the stylus. In this way, the pressure sensing value can be transmitted to the electronic device when the stylus has no Bluetooth module and device complexity is not increased, making transmission of the pressure sensing value more convenient and simpler.

DESCRIPTION OF EMBODIMENTS

The following describes technical solutions in embodiments of this application with reference to accompanying drawings in embodiments of this application. In descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "a plurality of" means two or more than two. "At least one of the following" or a similar expression thereof indicates any combination of these items, including a single item or any combination of a plurality of items. For example, at least one of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. Moreover, in embodiments of this application, terms such as "example" and "for example" are used to present an example, an instance, or an illustration. Any embodiment or design solution described as "example" or "for example" in embodiments of this application shall not be explained as being more preferred or having more advantages than another embodiment or design solution. To be precise, the terms such as "example" and "for example" are intended to present a related concept in a specific manner to facilitate understanding.

Figure 1:
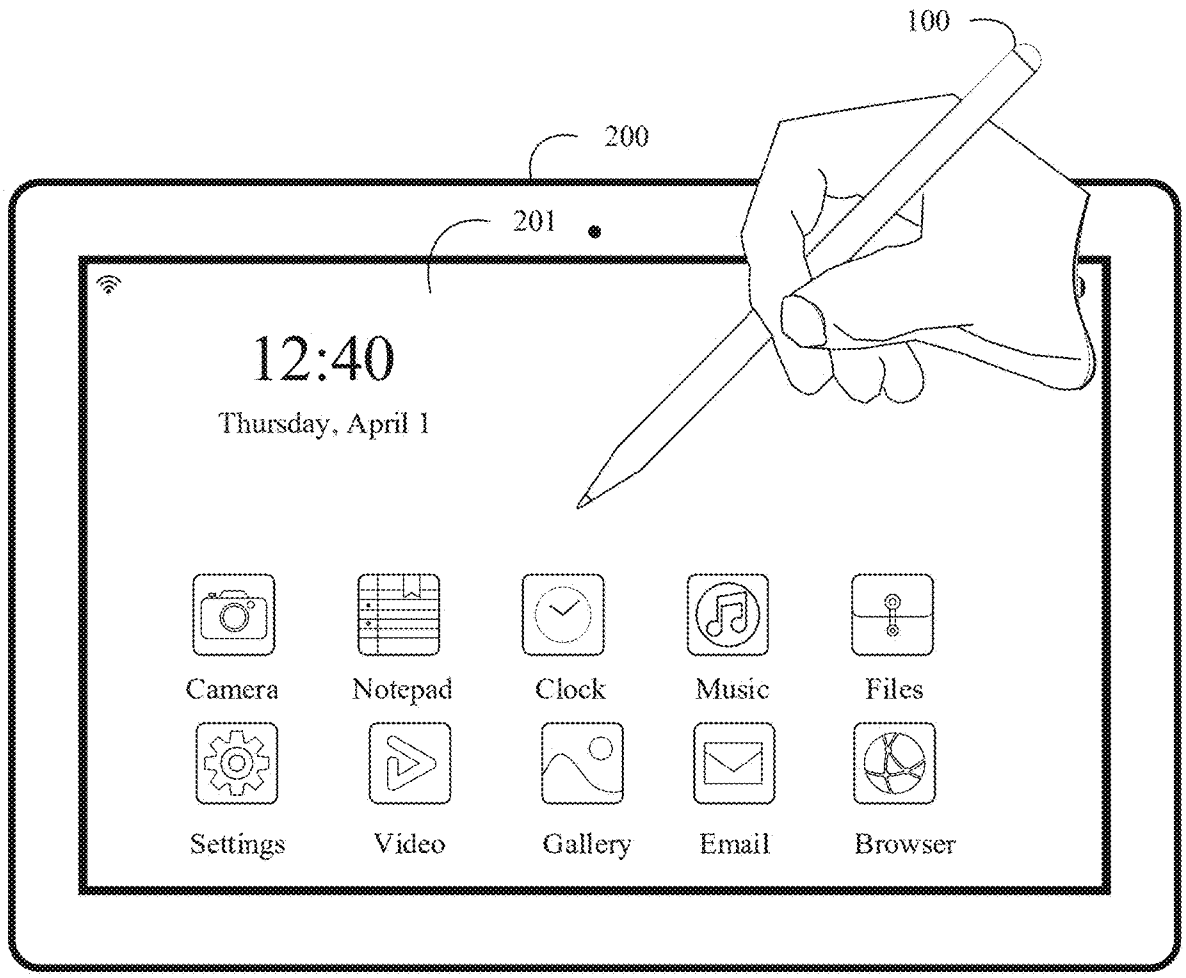
FIG. 1 is a schematic diagram of a structure of a communication system according to an embodiment of this application.

FIG. 1 is a schematic diagram of a scenario to which embodiments of this application are applicable. Refer to FIG. 1. The scenario includes a stylus 100 and an electronic device 200. In FIG. 1, an example in which the electronic device 200 is a tablet computer (tablet) is used for description. The stylus 100 may provide input to the electronic device 200, and the electronic device 200 performs an operation in response to the input based on the input of the stylus 100. In an embodiment, the stylus 100 and the electronic device 200 may be interconnected through a communication network to implement interaction of wireless signals. The communication network includes but is not limited to: a short-range communication network such as a Wi-Fi hotspot network, a Wi-Fi peer-to-peer (P2P) network, a Bluetooth network, a zigbee network, or a near field communication (NFC) network.

The stylus 100 may be a capacitive stylus. The capacitive stylus may include a passive capacitive stylus and an active capacitive stylus. The passive capacitive stylus may be referred to as a passive capacitive stylus, and the active capacitive stylus may be referred to as an active capacitive stylus. One or more electrodes may be disposed in the active capacitive stylus (for example, a pen tip), and the active capacitive stylus may transmit a signal through the electrode. As shown in FIG. 1, the electronic device 200 includes a touchscreen 201. The touchscreen 201 is integrated with an electrode array. In an embodiment, the electrode array may be a capacitive electrode array. When the stylus 100 is an active capacitive stylus, the electronic device 200 may receive a signal from the active capacitive stylus through the electrode array, and then identify, when receiving the signal, a position of the active capacitive stylus on the touchscreen and an inclination angle of the active capacitive stylus based on a change in a capacitance value on the touchscreen 201.

Figure 2A:
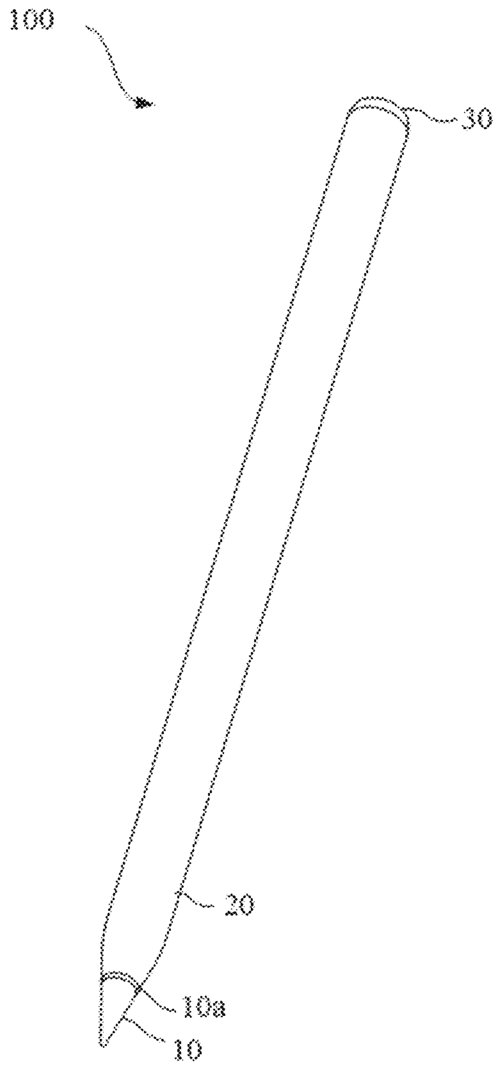
FIG. 2A is a schematic diagram of a structure of a stylus according to an embodiment of this application.

FIG. 2A is a schematic diagram of a structure of a stylus according to an embodiment of this application. Refer to FIG. 2A. The stylus 100 may include a pen tip 10, a pen holder 20, and a rear cover 30. The inside of the pen holder 20 is of a hollow structure. The pen tip 10 and the rear cover 30 are located at two ends of the pen holder 20. The rear cover 30 and the pen holder 20 may be connected through plugging or snapping. For a fitting relationship between the pen tip 10 and the pen holder 20, refer to descriptions in FIG. 2B.

Figure 2B:
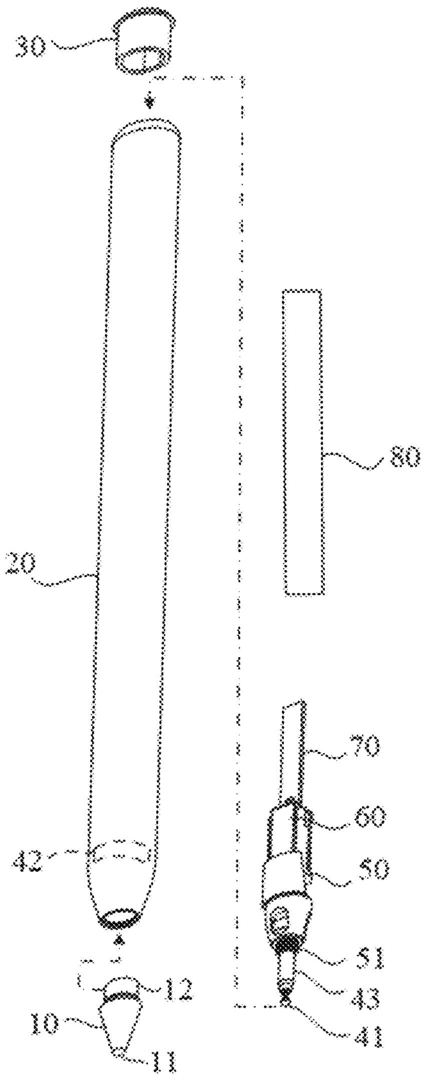
FIG. 2B is another schematic diagram of a structure of a stylus according to an embodiment of this application.

FIG. 2B is a schematic diagram of a partially disassembled structure of a stylus according to an embodiment of this application. Refer to FIG. 2B. The stylus 100 further includes a main shaft assembly 50. The main shaft assembly 50 is located in the pen holder 20, and the main shaft assembly 50 may be slidably disposed in the pen holder 20. The main shaft assembly 50 has an external thread 51, and the pen tip 10 includes a writing end 11 and a connecting end 12. The connecting end 12 of the pen tip 10 has an internal thread (not shown) that matches the external thread 51.

When the main shaft assembly 50 is assembled into the pen holder 20, the connecting end 12 of the pen tip 10 extends into the pen holder 20 and is connected, through a thread, to the external thread 51 of the main shaft assembly 50. In some other examples, the connecting end 12 of the pen tip 10 may alternatively be connected to the main shaft assembly 50 in a detachable manner such as snapping. The connecting end 12 of the pen tip 10 is detachably connected to the main shaft assembly 50, to implement replacement of the pen tip 10.

To detect pressure applied to the writing end 11 of the pen tip 10, as shown in FIG. 2A, there is a gap 10*a* between the pen tip 10 and the pen holder 20. In this way, it can be ensured that when the writing end 11 of the pen tip 10 is subject to an external force, the pen tip 10 can move toward the pen holder 20, and movement of the pen tip 10 drives the main shaft assembly 50 to move in the pen holder 20. To detect the external force, as shown in FIG. 2B, a pressure sensing assembly 60 is disposed on the main shaft assembly 50. A part of the pressure sensing assembly 60 is fixedly connected to a fixed structure in the pen holder 20, and a part of the pressure sensing assembly 60 is fixedly connected to the main shaft assembly 50. In this way, when the main shaft assembly 50 moves with the pen tip 10, because the part of the pressure sensing assembly 60 is fixedly connected to the fixed structure in the pen holder 20, movement of the main shaft assembly 50 drives the pressure sensing assembly 60 to deform. Deformation of the pressure sensing assembly 60 is transmitted to a circuit board 70 (for example, the pressure sensing assembly 60 and the circuit board 70 may be electrically connected to each other through a wire or a flexible circuit board), and the circuit board 70 detects the pressure of the writing end 11 of the pen tip 10 based on the deformation of the pressure sensing assembly 60.

It should be noted that detection of the pressure of the pen tip 10 includes but is not limited to the foregoing method. For example, a pressure sensor may also be disposed in the writing end 11 of the pen tip 10, so that the pressure sensor detects the pressure of the pen tip 10.

In this embodiment, as shown in FIG. 2B, the stylus 100 further includes a plurality of electrodes, and the plurality of electrodes may be, for example, a first emitter electrode 41, a grounding electrode 43, and a second emitter electrode 42. The first emitter electrode 41, the grounding electrode 43, and the second emitter electrode 42 are electrically connected to the circuit board 70. The first emitter electrode 41 may be located in the pen tip 10 and close to the writing end 11. The circuit board 70 may be configured as a control board that may provide signals to the first emitter electrode 41 and the second emitter electrode 42. The first emitter electrode 41 is configured to transmit an electrode signal (a first signal). When the first emitter electrode 41 is close to the touchscreen 201 of the electronic device 200, coupling capacitance may be formed between the first emitter electrode 41 and the touchscreen 201 of the electronic device 200, so that the electronic device 200 can receive the first signal. The second emitter electrode 42 is configured to transmit an electrode signal (a second signal). The electronic device 200 may determine an inclination angle of the stylus 100 based on a received second signal. In this embodiment of this application, the second emitter electrode 42 may be located on an inner wall of the pen holder 20. In an example, the second emitter electrode 42 may alternatively be located on the main shaft assembly 50.

The grounding electrode 43 may be located between the first emitter electrode 41 and the second emitter electrode 42. Alternatively, the grounding electrode 43 may be located on a periphery of the first emitter electrode 41 and the second emitter electrode 42. The grounding electrode 43 is configured to reduce coupling between the first emitter electrode 41 and the second emitter electrode 42.

When the electronic device 200 receives the first signal from the stylus 100, a capacitance value at a corresponding position on the touchscreen 201 changes. Therefore, the electronic device 200 may determine, based on the change in the capacitance value on the touchscreen 201, a position of the stylus 100 (or the pen tip of the stylus 100) on the touchscreen 201. In addition, the electronic device 200 may obtain the inclination angle of the stylus 100 by using a double-pen tip projection method in an inclination angle detection algorithm. Positions of the first emitter electrode 41 and the second emitter electrode 42 in the stylus 100 are different. Therefore, when the electronic device 200 receives the first signal and the second signal from the stylus 100, capacitance values at two positions on the touchscreen 201 change. The electronic device 200 may obtain the inclination angle of the stylus 100 based on a distance between the first emitter electrode 41 and the second emitter electrode 42 and a distance between the two positions at which the capacitance values change on the touchscreen 201. For more details of obtaining the inclination angle of the stylus 100, refer to related descriptions of the double-pen tip projection method in the conventional technology.

In this embodiment of this application, as shown in FIG. 2B, the stylus 100 further includes a battery assembly 80, and the battery assembly 80 is configured to provide a power supply to the circuit board 70. The battery assembly 80 may include a lithium-ion battery, or the battery assembly 80 may include a nickel-chromium battery, an alkaline battery, a nickel-hydrogen battery, or the like. In an embodiment, a battery included in the battery assembly 80 may be a rechargeable battery or a disposable battery. When the battery included in the battery assembly 80 is a rechargeable battery, the stylus 100 may charge the battery in the battery assembly 80 through wireless charging.

When the stylus 100 is an active capacitive stylus, after the electronic device 200 is wirelessly connected to the stylus 100, the electronic device 200 may send an electrode signal (an uplink signal) to the stylus 100 through the electrode array integrated on the touchscreen 201. The stylus 100 may receive the uplink signal through a receiver electrode, and the stylus 100 may transmit a downlink signal through an emitter electrode (for example, the first emitter electrode 41 and the second emitter electrode 42). The downlink signal includes the first signal and the second signal described above. When the pen tip 10 of the stylus 100 comes into contact with the touchscreen 201, a capacitance value at a corresponding position on the touchscreen 201 changes. The electronic device 200 may determine, based on a capacitance value on the touchscreen 201, a position of the pen tip 10 of the stylus 100 on the touchscreen 201. In an embodiment, the uplink signal and the downlink signal may be square wave signals.

Figure 3:
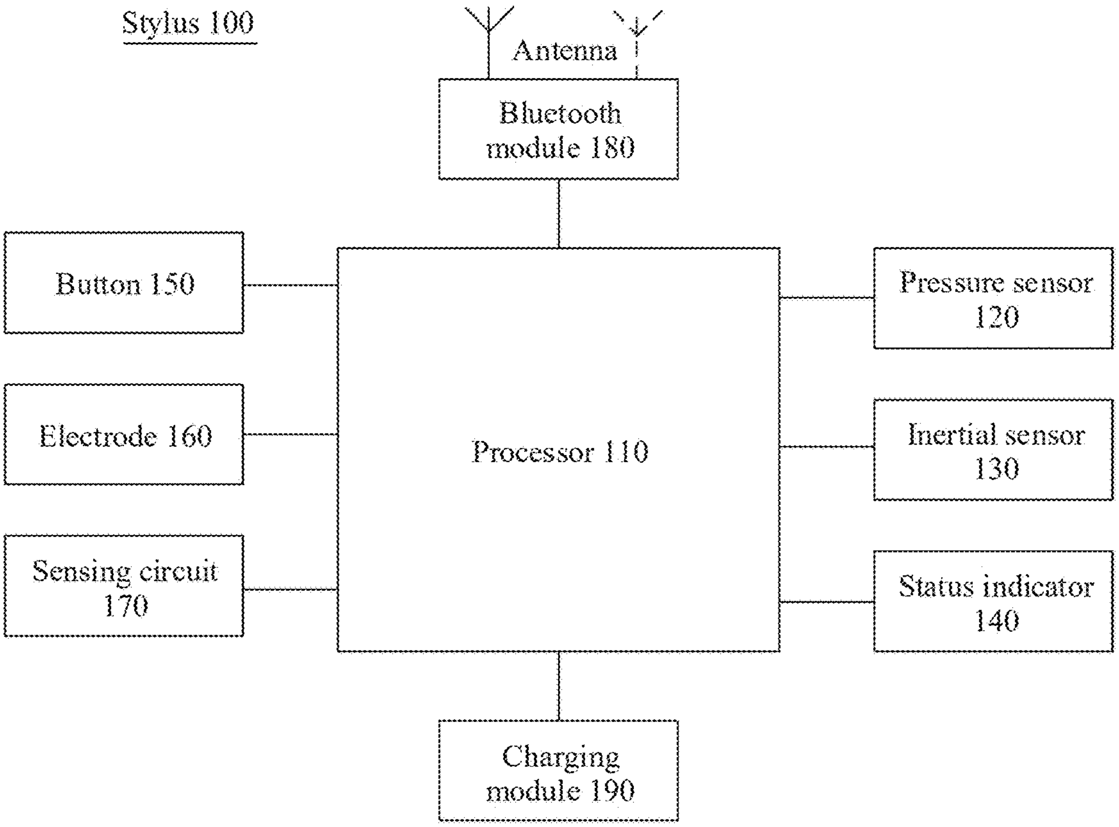
FIG. 3 is another schematic diagram of a structure of a stylus according to an embodiment of this application.

FIG. 3 is a schematic diagram of a hardware structure of a stylus according to an embodiment of this application. As shown in FIG. 3, the stylus 100 may include a processor 110. The processor 110 may include storage and processing circuits configured to support operations of the stylus 100. The storage and processing circuits may include a storage apparatus such as a non-volatile memory (for example, a flash memory or another electrically programmable read-only memory configured as a solid-state drive), a volatile memory (for example, a static or dynamic random access memory), and the like. The processing circuit in the processor 110 may be configured to control an operation of the stylus 100. The processing circuit may be based on one or more microprocessors, microcontrollers, digital signal processors, baseband processors, power supply management units, audio chips, application-specific integrated circuits, and the like.

The stylus 100 may include one or more sensors. For example, the sensors may include a pressure sensor 120. The pressure sensor 120 may be disposed at the writing end 11 of the stylus 100 (as shown in FIG. 2B). Certainly, the pressure sensor 120 may alternatively be disposed in the pen holder 20 of the stylus 100. In this way, after one end of the pen tip 10 of the stylus 100 is subject to a force, the other end of the pen tip 10 moves to apply a force to the pressure sensor 120. In an embodiment, the processor 110 may adjust, based on pressure detected by the pressure sensor 120, a thickness of a line written by the pen tip 10 of the stylus 100.

The sensors may further include an inertial sensor 130. The inertial sensor 130 may include a three-axis accelerometer and a three-axis gyroscope, and/or another component configured to measure movement of the stylus 100. For example, a three-axis magnetometer may be included in the sensor in a configuration of a nine-axis inertial sensor. The sensors may further include additional sensors such as a temperature sensor, an ambient light sensor, a light-based proximity sensor, a contact sensor, a magnetic sensor, a pressure sensor, and/or another sensor.

The stylus 100 may include a status indicator 140 such as a light-emitting diode, and a button 150. The status indicator 140 is configured to prompt a user of a status of the stylus 100. The button 150 may include a mechanical button and a non-mechanical button, and the button 150 may be configured to collect button press information from the user.

In this embodiment of this application, the stylus 100 may include one or more electrodes 160 (for details, refer to the descriptions in FIG. 2B), one electrode 160 may be located at the writing end of the stylus 100, and one electrode 160 may be located in the pen tip 10. Reference may be made to the foregoing related descriptions.

The stylus 100 may include a sensing circuit 170. The sensing circuit 170 may sense capacitive coupling between the electrode 160 and a drive line of a capacitive touch sensor panel that interacts with the stylus 100. The sensing circuit 170 may include an amplifier configured to receive a capacitance reading from the capacitive touch sensor panel, a clock configured to generate a demodulation signal, a phase shifter configured to generate a phase-shifted demodulation signal, a mixer configured to demodulate the capacitance reading by using an in-phase demodulation frequency component, a mixer configured to demodulate the capacitance reading by using a quadrature demodulation frequency component, and the like. A demodulation result of the mixer may be used to determine amplitude proportional to capacitance, so that the stylus 100 can sense contact with the capacitive touch sensor panel.

It may be understood that, according to an actual requirement, the stylus 100 may include a microphone, a speaker, an audio generator, a vibrator, a camera, a data port, and another device. The user may use these devices to provide commands to control operations of the stylus 100 and the electronic device 200 interacting with the stylus 100, and receive status information and another output.

The processor 110 may be configured to run software that is on the stylus 100 and that controls an operation of the stylus 100. During operation of the stylus 100, the software run on the processor 110 may process a sensor input, a button input, and an input from another apparatus, to monitor movement of the stylus 100 and another user input. The software run on the processor 110 may detect a user command and may communicate with the electronic device 200.

To support wireless communication between the stylus 100 and the electronic device 200, the stylus 100 may include a wireless module. In FIG. 3, an example in which the wireless module is a Bluetooth module 180 is used for description. The wireless module may alternatively be a Wi-Fi hotspot module, a Wi-Fi peer-to-peer module, or the like. The Bluetooth module 180 may include a radio frequency transceiver, for example, a transceiver. The Bluetooth module 180 may further include one or more antennas. The transceiver may use the antenna to transmit and/or receive a wireless signal. Based on a type of the wireless module, the wireless signal may be a Bluetooth signal, a wireless local area network signal, a remote signal such as a cellular phone signal, a near field communication signal, or another wireless signal.

The stylus 100 may further include a charging module 190. The charging module 190 may support charging of the stylus 100 and supply power to the stylus 100.

It should be understood that, the electronic device 200 in this embodiment of this application may be referred to as a user equipment (UE), a terminal, or the like. For example, the electronic device 200 may be a mobile terminal or a fixed terminal including a touchscreen, for example, a tablet computer (tablet), portable android device (PAD), a personal digital assistant (PDA), a handheld device having a wireless communication function, a computing device, an in-vehicle device or a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. A form of the terminal device is not specifically limited in embodiments of this application.

Figure 4:
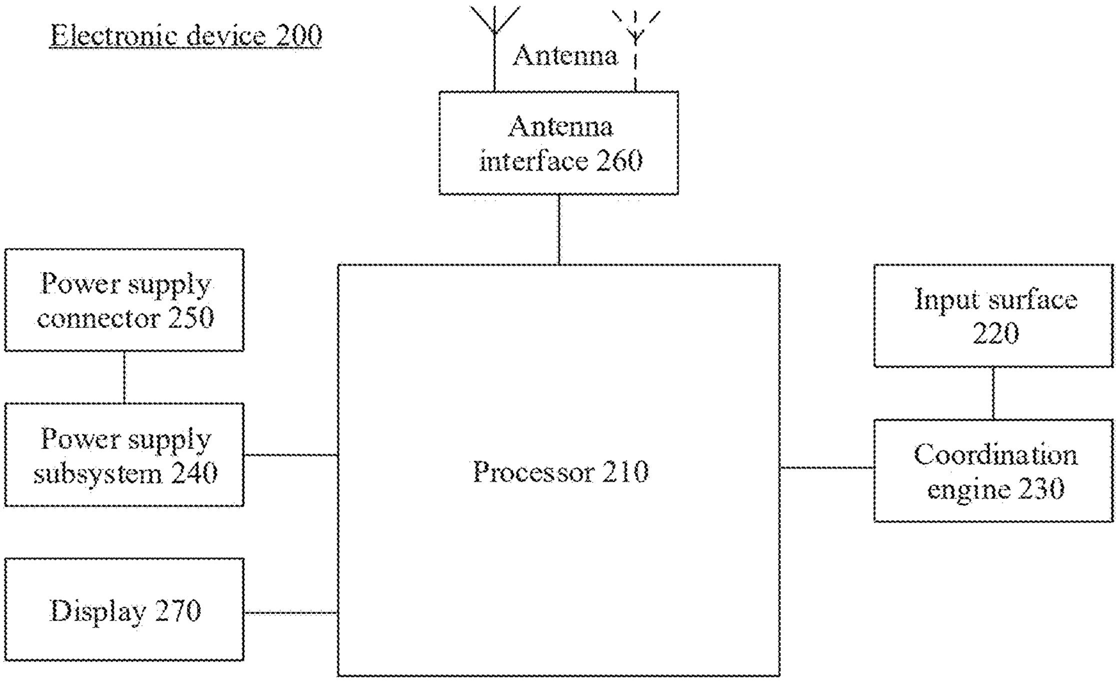
FIG. 4 is a schematic diagram of a structure of an electronic device according to an embodiment of this application.

FIG. 4 is a schematic diagram of a hardware structure of an electronic device according to an embodiment of this application. Refer to FIG. 4. The electronic device 200 may include a plurality of subsystems that cooperate to perform, coordinate, or monitor one or more operations or functions of the electronic device 202. The electronic device 200 includes a processor 210, an input surface 220, a coordination engine 230, a power supply subsystem 240, a power supply connector 250, a wireless interface 260, and a display 270.

For example, the coordination engine 230 may be configured to: communicate with another subsystem of the electronic device 200 and/or process data; communicate with and/or transact data with the stylus 100; measure and/or obtain outputs of one or more analog or digital sensors (for example, a touch sensor); measure and/or obtain outputs of one or more sensor nodes in a sensor node array (for example, a capacitive sensing node array); receive and locate a tip signal and a ring signal from the stylus 100; locate the stylus 100 based on positions of a tip signal crossing area and a ring signal crossing area, and the like.

The coordination engine 230 of the electronic device 200 includes or is otherwise communicatively coupled to a sensor layer that is located below the input surface 220 or integrated with the input surface. The coordination engine 230 locates the stylus 100 on the input surface 220 by using the sensor layer, and estimates an angular position of the stylus 100 relative to a plane of the input surface 220 by using the technology described in this specification. In an embodiment, the input surface 220 may be referred to as a touchscreen 201.

For example, the sensor layer of the coordination engine 230 of the electronic device 200 is capacitive sensing node grids arranged in columns and rows. More specifically, an array of column traces is arranged perpendicular to an array of row traces. The sensor layer may be separated from other layers of the electronic device, or the sensor layer may be directly disposed on another layer. For example, the other layers are but are not limited to: a display stack layer, a force sensor layer, a digitizer layer, a polarizer layer, a battery layer, a structural or decorative housing layer, and the like.

The sensor layer can operate in a plurality of modes. If the sensor layer operates in a mutual capacitance mode, the column traces and the row traces form a single capacitive sensing node (for example, "perpendicular" mutual capacitance) at each overlapping point. If the sensor layer operates in a self-capacitance mode, the column traces and the row traces form two (perpendicularly aligned) capacitive sensing nodes at each overlapping point. In another implementation solution, if the sensor layer operates in a mutual capacitance mode, adjacent column traces and/or adjacent row traces each may form a single capacitive sensing node (for example, "horizontal" mutual capacitance). As described above, the sensor layer may detect existence of the pen tip 10 of the stylus 100 and/or touch of a finger of the user by monitoring a change in capacitance (for example, mutual capacitance or self-capacitance) presented at each capacitive sensing node. In many cases, the coordination engine 230 may be configured to detect, through capacitive coupling, the tip signal and the ring signal received from the stylus 100 through the sensor layer.

The tip signal and/or the ring signal may include specific information and/or data that may be configured to enable the electronic device 200 to identify the stylus 100. Such information is generally referred to as "stylus identity" information in this specification. The information and/or data may be received by the sensor layer, and interpreted, decoded, and/or demodulated by the coordination engine 230.

The processor 210 may simultaneously receive inputs from more than one stylus by using the stylus identity information. Specifically, the coordination engine 230 may be configured to transmit, to the processor 210, a position and/or an angular position of each of several styluses detected by the coordination engine 230. In other cases, the coordination engine 230 may further transmit, to the processor 210, information about relative positions and/or relative angular positions of a plurality of styluses detected by the coordination engine 230. For example, the coordination engine 220 may notify the processor 210 of a position of a detected first stylus relative to a detected second stylus.

In other cases, the end signal and/or the ring signal may further include specific information and/or data used to enable the electronic device 200 to identify a specific user. Such information is generally referred to as "user identity" information in this specification.

The coordination engine 230 may forward the user identity information (if the user identity information is detected and/or can be restored) to the processor 210. If the user identity information cannot be restored from the tip signal and/or the ring signal, the coordination engine 230 may optionally indicate to the processor 210 that the user identity information is unavailable. The processor 210 can use the user identity information (or absence of the information) in any suitable manner, including but not limited to: accepting or denying an input from the specific user, allowing or denying access to a specific function of the electronic device, and the like. The processor 210 may simultaneously receive inputs from more than one user by using the user identity information.

In still other cases, the tip signal and/or the ring signal may include specific information and/or data that may be configured to enable the electronic device 200 to identify a setting or a preference of the user or the stylus 100. Such information is generally referred to as "stylus setting" information in this specification.

The coordination engine 230 may forward the stylus setting information (if the stylus setting information is detected and/or can be restored) to the processor 210. If the stylus setting information cannot be restored from the tip signal and/or the ring signal, the coordination engine 230 may optionally indicate to the processor 210 that the stylus setting information is unavailable. The electronic device 200 can use the stylus setting information (or absence of the information) in any suitable manner, including but not limited to: applying the setting to the electronic device, applying the setting to a program run on the electronic device, changing a line thickness, a color, and a pattern presented by a graphics program of the electronic device, changing a setting of a video game operated on the electronic device, and the like.

Generally, the processor 210 may be configured to perform, coordinate, and/or manage functions of the electronic device 200. Such functions may include but are not limited to: communicating with and/or transacting data with another subsystem of the electronic device 200, communicating with and/or transacting data with the stylus 100, performing data communication and/or transacting data through a wireless interface, performing data communication and/or transacting data through a wired interface, facilitating exchange of power through a wireless (for example, inductive or resonant) or wired interface, receiving positions and angular positions of one or more styluses, and the like.

The processor 210 may be implemented as any electronic device that can process, receive, or send data or instructions. For example, the processor may be a microprocessor, a central processing unit, an application-specific integrated circuit, a field programmable gate array, a digital signal processor, an analog circuit, a digital circuit, or a combination of these devices. The processor may be a single-thread or multi-thread processor. The processor may be a single-core or multi-core processor.

During use, the processor 210 may be configured to access a memory storing instructions. The instructions may be configured to enable the processor to perform, coordinate, or monitor one or more operations or functions of the electronic device 200.

The instructions stored in the memory may be configured to control or coordinate operations of other components of the electronic device 200. The components are, for example, but not limited to: another processor, an analog or digital circuit, a volatile or non-volatile memory module, a display, a speaker, a microphone, a rotary input device, a button or another physical input device, a biometric authentication sensor and/or system, a force or touch input/output component, a communication module (for example, a wireless interface and/or a power supply connector), and/or a haptic feedback device.

The memory may further store electronic data that can be used by the stylus or the processor. For example, the memory may store electronic data or content (for example, a media file, a document, and an application), a device setting and preference, a timing signal and a control signal or data, data structures, or databases used for various modules, a file or a configuration related to detection of a tip signal and/or a ring signal, and the like. The memory may be configured as any type of memory. For example, the memory may be implemented as a random access memory, a read-only memory, a flash memory, a removable memory, another type of storage element, or a combination of such devices.

The electronic device 200 further includes the power supply subsystem 240. The power supply subsystem 240 may include a battery or another power supply. The power supply subsystem 240 may be configured to supply power to the electronic device 200. The power supply subsystem 240 may be further coupled to the power supply connector 250. The power supply connector 250 may be any suitable connector or port that may be configured to receive power from an external power supply and/or configured to supply power to an external load. For example, in some implementation solutions, the power supply connector 250 may be configured to recharge the battery in the power supply subsystem 240. In another implementation solution, the power supply connector 250 may be configured to transmit, to the stylus 100, power stored in (or available to) the power supply subsystem 240.

The electronic device 200 further includes the wireless interface 260, to facilitate electronic communication between the electronic device 200 and the stylus 100. In an implementation solution, the electronic device 200 may be configured to communicate with the stylus 100 through a low-energy Bluetooth communication interface or a near field communication interface. In another example, the communication interface facilitates electronic communication between the electronic device 200 and an external communication network, a device, or a platform.

The wireless interface 260 (whether a communication interface between the electronic device 200 and the stylus 100 or another communication interface) may be implemented as one or more wireless interfaces, Bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, or any conventional communication interface.

The electronic device 200 further includes the display 270. The display 270 may be located behind the input surface 220, or may be integrated with the input surface. The display 270 may be communicatively coupled to processor 210. The processor 210 may use the display 270 to present information to the user. In many cases, the processor 210 uses the display 270 to present an interface with which the user can interact. In many cases, the user manipulates the stylus 100 to interact with the interface.

It is apparent to a person skilled in the art that, some of specific details presented above with respect to the electronic device 200 may not be required to practice specific described implementation solutions or equivalents thereof. Similarly, another electronic device may include a larger quantity of subsystems, modules, components, and the like. Some submodules may be implemented as software or hardware in a proper case. Therefore, it should be understood that, the foregoing descriptions are not intended to be exhaustive or to limit the present disclosure to precise forms described in this specification. On the contrary, it is apparent to a person of ordinary skill in the art that, many modifications and variations are possible according to the foregoing teachings.

Figure 5:
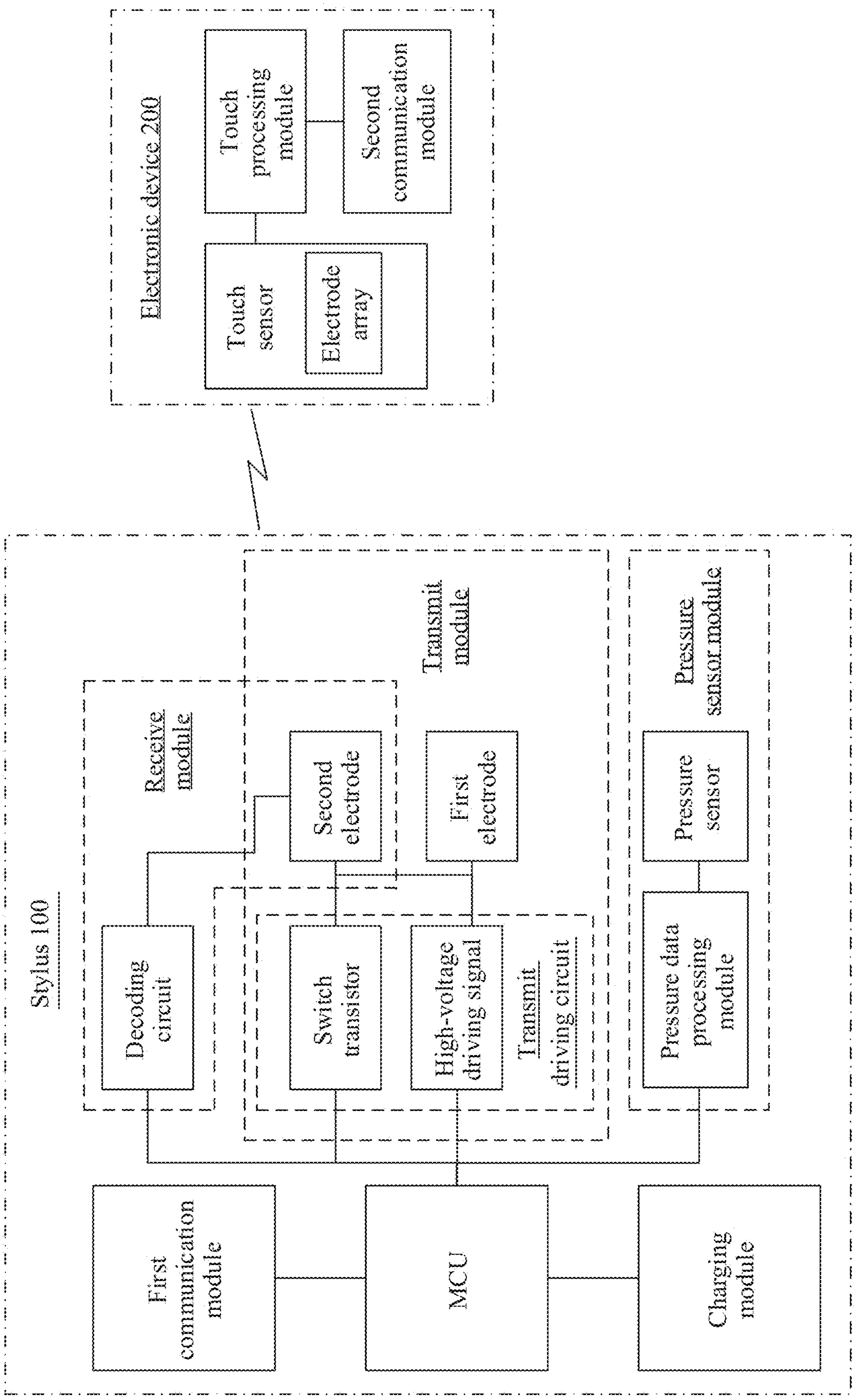
FIG. 5 is a schematic diagram of functional modules of a stylus according to an embodiment of this application.

FIG. 5 is a schematic diagram of interaction between a stylus and an electronic device according to an embodiment of this application. Refer to FIG. 5. The stylus includes a microcontroller unit (MCU), a first communication module, a charging module, a pressure sensor module, a transmit (transport, TX) module, and a receive (receive, RX) module. The electronic device includes a touch sensor, a touch processing module, and a second communication module. It should be understood that, the following embodiment is described by using an example in which both the first communication module and the second communication module are Bluetooth modules. The first communication module and the second communication module may alternatively be wireless local area network modules, Wi-Fi modules, or the like. This is not limited in embodiments of this application. It should be understood that the stylus and the electronic device may establish a wireless path by using the first communication module and the second communication module, to exchange wireless signals.

In the electronic device, the touch processing module is connected to the touch sensor and the second communication module. The touch sensor may include an electrode array. The touch sensor is configured to collect touch data, and the touch data may include data that the stylus touches a touchscreen. The touch processing module is configured to determine a position of a pen tip of the stylus and an included angle between the stylus and the touchscreen (hereinafter briefly referred to as an included angle) based on the touch data collected by the touch sensor. After the electronic device and the stylus establish the wireless path, that is, a wireless connection, the touch processing module may send an uplink signal through the electrode array. The uplink signal is used to indicate the stylus to feed back a downlink signal. The touch processing module may determine the position of the pen tip of the stylus and the included angle based on the downlink signal from the stylus. In an embodiment, the uplink signal may be a square wave signal, and the touch processing module may be a touch integrated circuit chip.

In the stylus, the MCU is connected to the first communication module, the charging module, the pressure sensor module, the transmit module, and the receive module. It should be understood that, the MCU may be understood as the processor shown in FIG. 3. The charging module is configured to charge the stylus. The pressure sensor module includes a pressure sensor and a pressure data processing module. The pressure sensor is connected to the pressure data processing module, and the pressure data processing module is connected to the MCU. The pressure sensor may be disposed at the pen tip of the stylus, and the pressure sensor is configured to detect pressure of the pen tip. The data processing module is configured to collect pressure data from the pressure sensor, and send the pressure data to the MCU.

The transmit module includes a first electrode, a second electrode, and a transmit driving circuit. Both the first electrode and the second electrode are connected to the transmit driving circuit, and the transmit driving circuit is connected to the MCU. The MCU is configured to generate a first pulse width modulation (PWM) signal and a second PWM signal, and send the first PWM signal and the second PWM signal to the transmit driving circuit. The transmit driving circuit may drive, based on the first PWM signal, the first electrode to send a first signal, and drive, based on the second PWM signal, the second electrode to send a second signal. Both the first electrode and the second electrode may send signals. The first electrode may be referred to as TX1, and the second electrode may be referred to as TX2.

In an embodiment, the first signal and the second signal may be referred to as downlink signals or coding signals. In an embodiment, the downlink signal may be a square wave signal. It should be understood that the uplink signal and the downlink signal in this embodiment of this application are from the perspective of the stylus. It is conceivable that from the perspective of the electronic device, the electronic device may send a downlink signal to the stylus, and the stylus may send an uplink signal to the electronic device based on the downlink signal. The following embodiment is described by using an example in which the stylus sends a downlink signal and the electronic device sends an uplink signal.

Refer to FIG. 5. In an embodiment, the transmit driving circuit may include a high-voltage driving signal module and a switch transistor. The MCU is connected to the high-voltage driving signal module and the switch transistor. The switch transistor is connected to the second electrode, and the high-voltage driving signal is connected to the first electrode and the second electrode. The high-voltage driving signal module is configured to: provide a high-voltage driving signal, drive, based on the first PWM signal from the MCU, the first electrode to send the first signal, and drive, based on the second PWM signal from the MCU, the second electrode to send the second signal.

In an embodiment, the MCU is further configured to control the switch transistor, to implement switching of the second electrode between signal sending and signal receiving, that is, to implement switching of the second electrode between TX2 and RX. A specific circuit of the switch transistor and a control mode of the MCU are not described in detail in this embodiment of this application. That is, the MCU may control the switch transistor, to use the second electrode as TX2, and the second electrode used as TX2 is connected to the transmit driving circuit, so that the second electrode can send the second signal. The MCU may also control the switch transistor, to use the second electrode as RX, and the second electrode used as RX is connected to the receive module, so that the second electrode can receive the uplink signal from the electronic device. In other words, the second electrode can be switched between TX2 and RX under control of the MCU.

The receive module includes a decoding circuit. The decoding circuit may be connected to the switch transistor, and the decoding circuit is further connected to the MCU. The second electrode is configured to receive the uplink signal from the electronic device and send the uplink signal to the decoding circuit. The decoding circuit is configured to decode the uplink signal and send a decoded uplink signal to the MCU.

Based on the structure shown in FIG. 5, a process of interaction between the electronic device and the stylus is described below. The pen tip of the stylus is provided with an electrode, and the touch sensor of the electronic device includes an electrode array. An insulating substance (for example, air or glass on the touchscreen) exists between electrodes of the pen tip of the stylus and the touch sensor. Therefore, this is equivalent to that a capacitor exists between the electrodes of the pen tip of the stylus and the touch sensor. The pen tip of the stylus and the touch sensor of the electronic device may establish a circuit connection through the capacitor. When the touch sensor receives the first signal from the first electrode of the stylus, a capacitance value at a corresponding position on the touchscreen changes.

Figure 6:
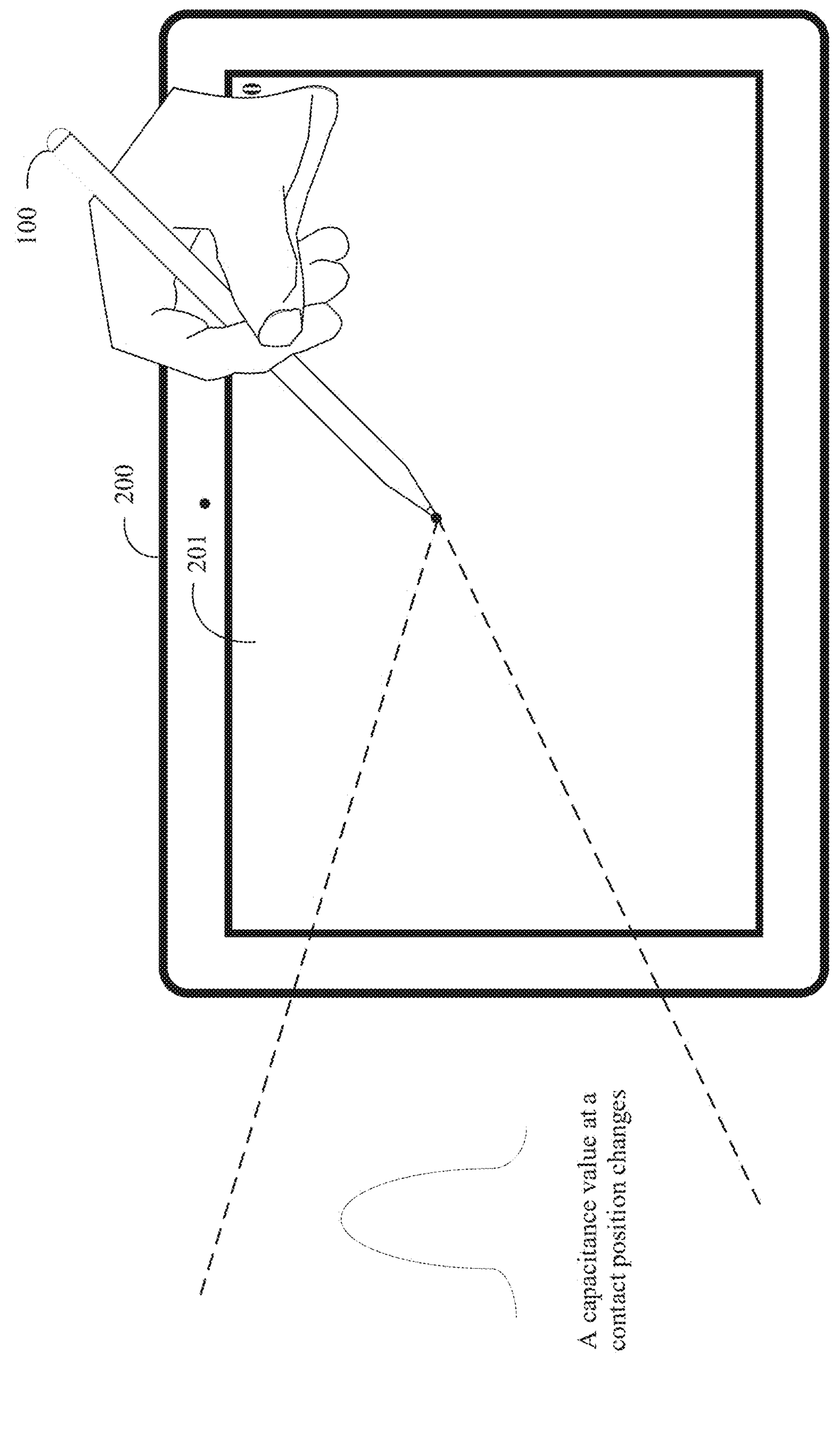
FIG. 6 is a schematic diagram of a change in a capacitance value of a touchscreen according to an embodiment of this application.

Refer to FIG. 6. In FIG. 6, generation of a peak of a capacitance value represents a change in a capacitance value at a corresponding position on the touchscreen 201. The electronic device 200 may determine a position of the pen tip of the stylus 100 based on the change in the capacitance value on the touchscreen. In addition, the electronic device may obtain an included angle by using a double-pen tip projection method in an inclination angle detection algorithm. A position at which the stylus comes into contact with the touchscreen is represented by a black dot in FIG. 6.

Figure 7:
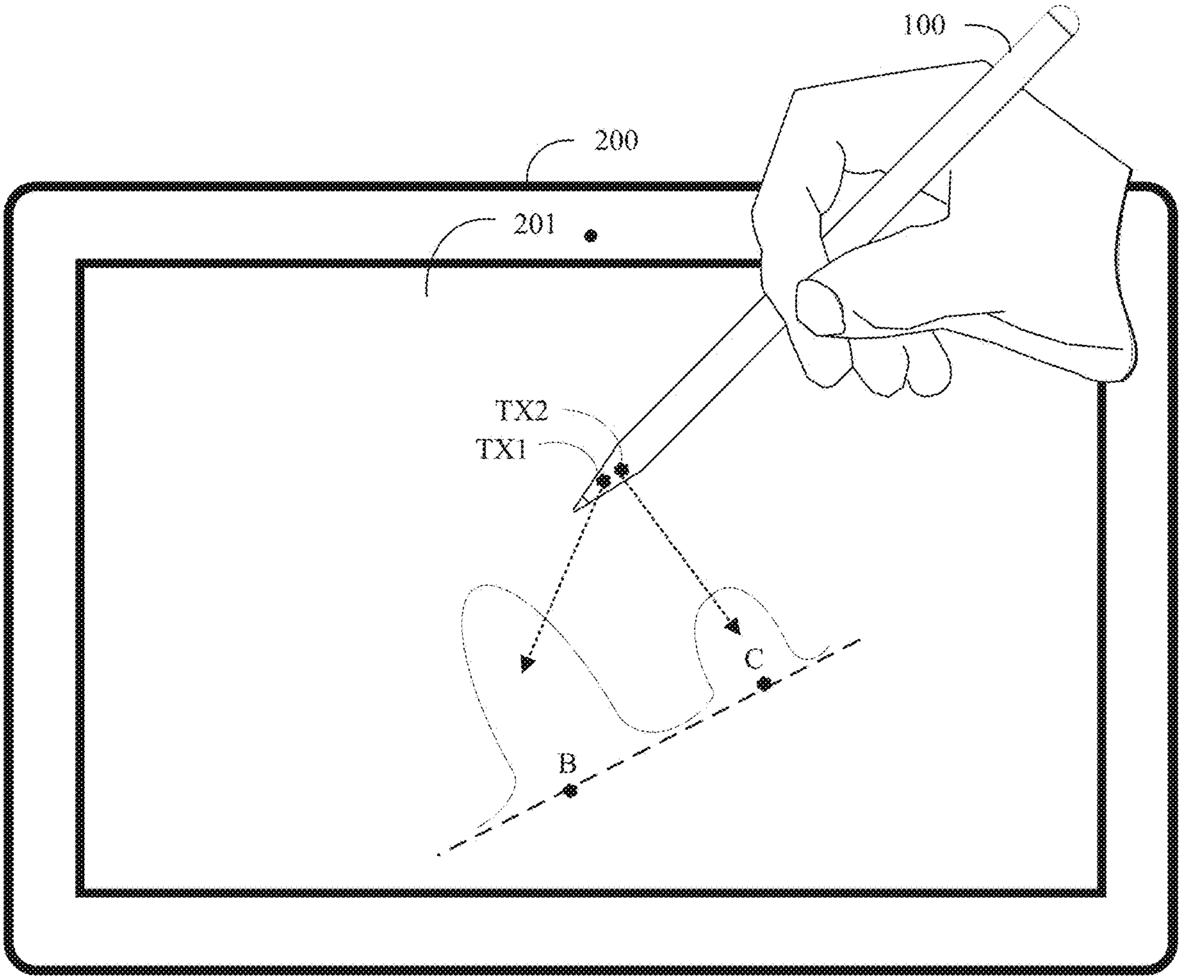
FIG. 7 is another schematic diagram of a change in a capacitance value of a touchscreen according to an embodiment of this application.

Refer to FIG. 7. The first electrode (TX1) and the second electrode (TX2) of the stylus may be disposed at the pen tip of the stylus 100. The first electrode is disposed close to a tip of the pen tip, and the second electrode is disposed away from the tip of the pen tip relative to the first electrode. When the touch sensor receives the first signal from the first electrode of the stylus and the second signal from the second electrode, capacitance values at two positions (for example, a position B and a position C) on the touchscreen 201 change, and the electronic device 200 may obtain an included angle based on a distance between the first electrode and the second electrode and a distance between the two positions on the touchscreen. For more details about the double-pen tip projection method, refer to related descriptions in the conventional technology. The position B and the position C are represented by black dots in FIG. 7.

For ease of description of an information transmission method provided in this application, terms related in embodiments of this application are explained first.

A refresh rate of an electronic device is a quantity of refreshes per second of a picture displayed by the electronic device. The refresh rate of the electronic device may also be referred to as a display frequency or a display frame rate. The refresh rate of the electronic device may be but is not limited to 60 Hz, 90 Hz, and 120 Hz. For example, that the refresh rate of the electronic device is 60 Hz means that the electronic device refreshes, at an interval of 16.6 ms (1000 ms/60), a picture displayed by a touchscreen.

That the electronic device sends an uplink signal at a refresh rate of 60 Hz means that the electronic device sends an uplink signal to a stylus at an interval of 16.6 ms.

A periodicity of an uplink signal is duration between two uplink signals sent by the electronic device. If the refresh rate of the electronic device is 60 Hz, a periodicity for the electronic device to send an uplink signal is 16.6 ms.

Signal synchronization between an electronic device and a stylus: The electronic device can sample downlink signals (including an electrode signal sent by TX1 and an electrode signal sent by TX2) from the stylus, and obtain a position of the stylus and an included angle based on the downlink signals.

Figure 8:
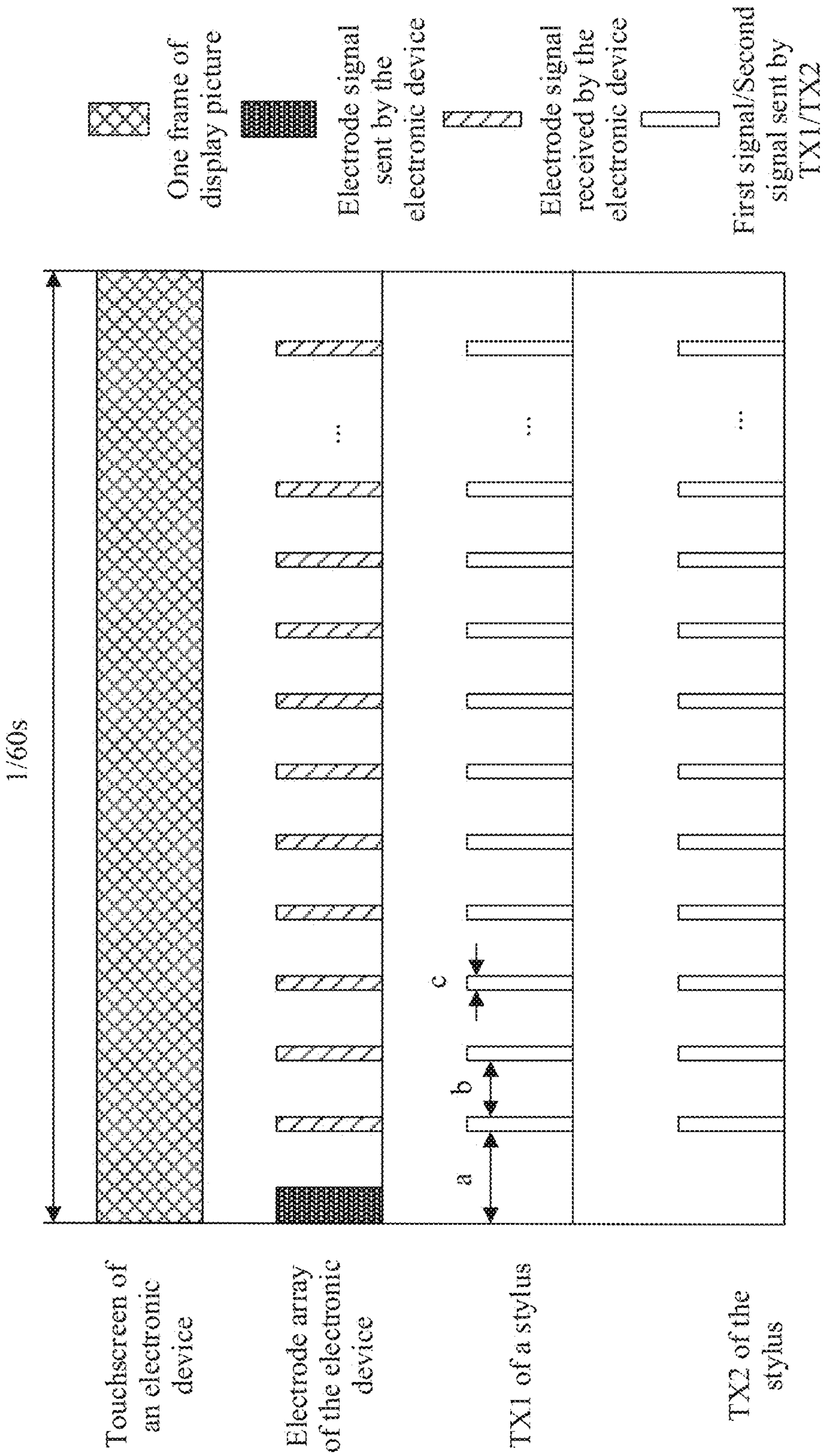
FIG. 8 is a schematic diagram of signal synchronization according to an embodiment of this application.

For example, FIG. 8 is a time sequence diagram of signal synchronization between an electronic device and a stylus according to an embodiment of this application. FIG. 8 shows a time sequence in which the electronic device sends an electrode signal and receives (samples) electrode signals from the stylus (TX1 and TX2), and also shows a time sequence in which TX1 of the stylus sends electrode signals (first signals) and a time sequence in which TX2 sends electrode signals (second signals). Refer to FIG. 8. For example, a refresh rate of the electronic device is 60 Hz, and the electronic device refreshes a screen based on 60 Hz, that is, displays one frame of display picture every 1/60 s. The electronic device (an electrode array of the electronic device) may send an electrode signal every 1/60 s. When receiving an uplink signal from the electronic device, the stylus may send N electrode signals within 1/60 s. TX1 may send N electrode signals within 1/60 s, and TX2 may send N electrode signals within 1/60 s. Correspondingly, after sending the uplink signal, the electronic device may sample the electrode signals from the stylus N times within 1/60 s. The electronic device may obtain a position of a pen tip of the stylus and an included angle based on the electrode signal sampled each time.

Refer to FIG. 8. In an embodiment, the stylus and the electronic device may store a configuration file, and the configuration file includes values of a, b, c, and N. a indicates duration between the stylus receiving an electrode signal from the electronic device and sending a first electrode signal. b indicates duration between two adjacent electrode signals sent by the stylus. c indicates duration occupied by one electrode signal. N indicates a quantity of electrode signals sent by the stylus between two adjacent electrode signals. a, b, c, and N may be pre-agreed. To be specific, the electronic device can determine, based on preconfigured a, b, c, and N, a sampling strategy to be used after sending of an electrode signal. For example, the electronic device samples, based on a, b, and c, electrode signals N times within a periodicity of one electrode signal. Similarly, the stylus can determine, based on preconfigured a, b, c, and N, a strategy for sending an electrode signal. For example, after receiving an electrode signal from the electronic device, the stylus sends N electrode signals based on a refresh rate of the electronic device and based on a, b, and c.

It should be understood that in this embodiment of this application, "the electronic device samples electrode signals from the stylus N times within A ms after sending an electrode signal" may be understood as follows: Within a periodicity of A ms of one electrode signal, the electronic device samples an electrode signal from the stylus for the first time a ms after sending the electrode signal, and then samples an electrode signal from the stylus at an interval of b ms, where N times of sampling are performed on electrode signals in total, and duration of each time of sampling is c ms. Similarly, "the stylus sends N electrode signals within a periodicity of A ms of one electrode signal" means that the stylus sends a first electrode signal a ms after receiving an electrode signal from the electronic device, and then sends an electrode signal at an interval of b ms, where N electrode signals are sent in total, and duration occupied by each electrode signal is c ms. In this way, the electronic device can keep signal synchronization with the stylus.

When the refresh rate is 60 Hz, A is 16.6 ms (1/60 s); when the refresh rate is 90 Hz, A is 11.1 ms (1/90 s); or when the refresh rate is 120 Hz, A is 8.3 ms (1/120 s). It should be understood that a, b, and c vary according to the refresh rate, and this may be understood as follows: a at the refresh rate of 60 Hz is different from a at the refresh rate of 90 Hz, b at the refresh rate of 60 Hz is different from b at the refresh rate of 90 Hz, and c at the refresh rate of 60 Hz is different from c at the refresh rate of 90 Hz. That is, a, b and c in the configuration file vary according to the refresh rate.

Pressure sensing value: A stylus generally has a pressure sensing component. Through contact between a front pen tip and a screen, a force applied to the pen is transmitted to the pressure sensing component inside a pen body through the pen tip. The pressure sensing component senses the force and calculates a pressure sensing value. An electronic device can draw, based on different pressure sensing values, lines of varying thicknesses that match the pressure sensing values.

Transmission of a pressure sensing value: Currently, a stylus can transmit a pressure sensing level to an electronic device through a Bluetooth channel. However, some styluses may have no Bluetooth module and cannot transmit pressure sensing values. In another possible design, a pressure sensing value can be transmitted by performing frequency modulation on an electrode of a pen tip. For example, for a pressure sensing level of a, an emitter electrode of the pen tip has a frequency of fa, and for a pressure sensing level of b, the emitter electrode of the pen tip has a frequency of fb. A frequency modulation component on the electronic device detects a frequency, and then a pressure sensing level to be transmitted by the pen can be obtained based on a mapping table. However, this requires adding an additional frequency modulation circuit to the stylus and adding a multi-frequency detection circuit to the electronic device, which increases design complexity of circuits of the pen and the electronic device.

This application provides an information transmission method and an apparatus, to transmit information (for example, a pressure sensing value) to an electronic device when a stylus has no Bluetooth module and device complexity is not increased. The electronic device can draw, based on different pressure sensing values, lines of varying thicknesses that match the pressure sensing values.

The information transmission method provided in embodiments of this application is described below with reference to specific embodiments. The following embodiments may be combined with each other, and the same or similar concepts or processes may not be repeated in some embodiments.

Figure 9:
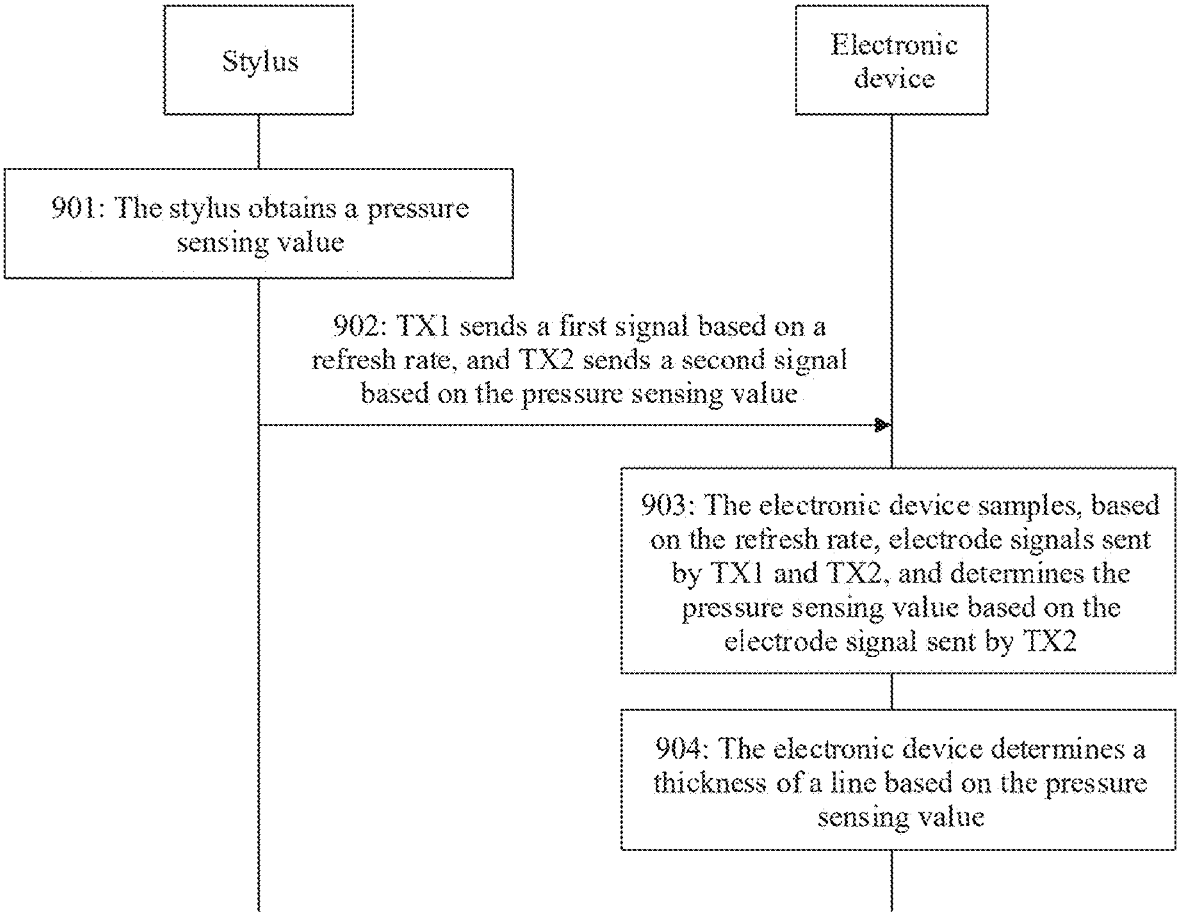
FIG. 9 is a schematic diagram of signal interaction according to an embodiment of this application.

FIG. 9 is a schematic flowchart of an embodiment of an information transmission method according to an embodiment of this application. As shown in FIG. 9, the information transmission method may include the following steps.

901: A stylus obtains a pressure sensing value.

The stylus may obtain the pressure sensing value through a pressure sensing assembly. For example, as shown in FIG. 2B, a pressure sensing assembly 60 is disposed on a main shaft assembly 50. A part of the pressure sensing assembly 60 is fixedly connected to a fixed structure in a pen holder 20, and a part of the pressure sensing assembly 60 is fixedly connected to the main shaft assembly 50. In this way, when the main shaft assembly 50 moves with a pen tip 10, because the part of the pressure sensing assembly 60 is fixedly connected to the fixed structure in the pen holder 20, movement of the main shaft assembly 50 drives the pressure sensing assembly 60 to deform. Deformation of the pressure sensing assembly 60 is transmitted to a circuit board 70 (for example, the pressure sensing assembly 60 and the circuit board 70 may be electrically connected to each other through a wire or a flexible circuit board), and the circuit board 70 detects pressure of a writing end 11 of the pen tip 10 based on the deformation of the pressure sensing assembly 60, to calculate the pressure sensing value.

It should be noted that detection of the pressure of the pen tip 10 includes but is not limited to the foregoing method. For example, a pressure sensor may also be disposed in the writing end 11 of the pen tip 10, so that the pressure sensor detects the pressure of the pen tip 10, to calculate the pressure sensing value. This is not limited in this application.

902: TX1 sends a first signal based on a refresh rate, and TX2 sends a second signal based on the pressure sensing value.

TX1 may send N downlink signals within a periodicity of one uplink signal based on a refresh rate of an electronic device. For example, the refresh rate of the electronic device is 60 Hz, and that TX1 sends the first signal based on 60 Hz means that TX1 sends N first signals to the electronic device within 16.6 ms after receiving an uplink signal from the electronic device.

TX2 may send M second signals within the periodicity of one uplink signal based on the refresh rate of the electronic device, where M is related to the pressure sensing value.

In this embodiment of this application, a time sequence of the electrode signals sent by TX1 of the stylus may be used as a reference to change a time sequence of the electrode signals of TX2 of the stylus, to transmit the pressure sensing value through existence or absence of the electrode signals sent by TX2.

In a possible design, an MCU in the stylus may trigger TX1 and TX2 to send electrode signals. For example, as shown in FIG. 5, the MCU in the stylus may send a first PWM signal to a transmit driving circuit based on a preset configuration file (preconfigured a, b, c, and N) (that is, a quantity and a time sequence of first PWM signals may be determined based on preconfigured a, b, c, and N), and send a second PWM signal to the transmit driving circuit based on the pressure sensing value (that is, a quantity and a time sequence of second PWM signals may be determined based on the pressure sensing value). The transmit driving circuit may drive, based on the first PWM signal, the first electrode to send a first signal, and drive, based on the second PWM signal, the second electrode to send a second signal. For example, TX1 may send N electrode signals within a periodicity of each uplink signal based on the first PWM signal. TX2 may send M electrode signals within the periodicity of each uplink signal based on the second PWM signal.

903: The electronic device samples, based on the refresh rate, electrode signals sent by TX1 and TX2, and determines the pressure sensing value based on the electrode signal sent by TX2.

The electronic device may sample, within the periodicity of one uplink signal based on the refresh rate of the electronic device, the electrode signals sent by TX1 and TX2. For example, the refresh rate of the electronic device is 60 Hz, and that the electronic device samples, based on 60 Hz, the electrode signals sent by TX1 and TX2 means that within 16.6 ms after the electronic device sends the uplink signal to the stylus, the electronic device performs scanning on the electrode signals sent by TX1 and TX2. If the electrode signal of TX1 exists but the electrode signal of TX2 does not exist at a first moment, the electrode signal corresponding to TX2 at the first moment is marked as 0;

and if the electrode signal of TX1 exists and the electrode signal of TX2 exists at a second moment, the electrode signal corresponding to TX2 at the second moment is marked as 1. Alternatively, if the electrode signal of TX1 exists but the electrode signal of TX2 does not exist at the first moment, the electrode signal corresponding to TX2 at the first moment is marked as 1; and if the electrode signal of TX1 exists and the electrode signal of TX2 exists at the second moment, the electrode signal corresponding to TX2 at the second moment is marked as 0. The electronic device may obtain a set of binary data (target coding data) according to marking performed on the electrode signals of TX2 within the periodicity of one uplink signal. N bits or N-Q bits of the binary data may be used to represent the pressure sensing value of the stylus.

Figure 10:
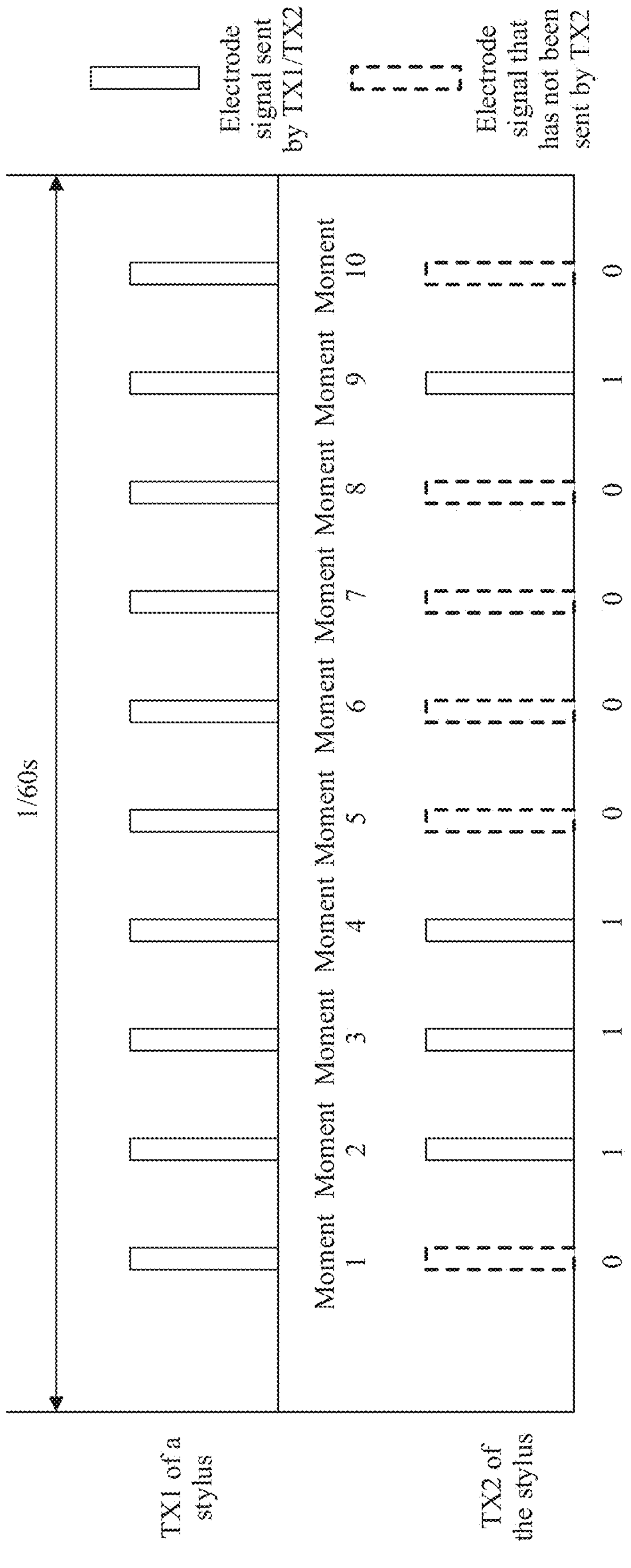
FIG. 10 is a schematic diagram of a signal transmit time sequence according to an embodiment of this application.

For example, as shown in FIG. 10, transmit time sequences of TX1 and TX2 are as follows: TX1 sends electrode signals (first signals) at a moment 1 to a moment 10, and TX2 sends electrode signals (second signals) only at the moment 2, the moment 3, the moment 4, and the moment 9. The electronic device performs scanning based on the time sequence of the electrode signals sent by TX1. If it is determined that a pulse of TX2 at the moment 1 does not exist, the pulse is marked as 0; if a pulse at the moment 2 exists, the pulse is marked as 1; if a pulse at the moment 3 exists, the pulse is marked as 1; if a pulse at the moment 4 exists, the pulse is marked as 1; if a pulse at the moment 5 does not exist, the pulse is marked as 0; if a pulse at the moment 6 does not exist, the pulse is marked as 0; if a pulse at the moment 7 does not exist, the pulse is marked as 0; if a pulse at the moment 8 does not exist, the pulse is marked as 0; if a pulse at the moment 9 exists, the pulse is marked as 1; and if a pulse at the moment 10 does not exist, the pulse is marked as 1. The electronic device may determine a set of binary data 01 1100 0010 including N bits (that is, 10 bits) based on existence or absence of the electrode signals of TX2 at the 10 moments, and may determine, based on 01 1100 0010, that the pressure sensing value is 450.

In addition, the electronic device may alternatively determine the pressure sensing value based on partial data of the determined N-bit binary data. For example, the pressure sensing value is determined based on N-Q bits (for example, 9 bits) of data. The N-Q bits of data may be first N-Q bits, last N-Q bits, or intermediate N-Q bits of the N-bit binary data. This is not limited in this application. For example, it is determined based on last 8 bits of the binary data 01 1100 0010 that the pressure sensing value is 194. Q is an integer less than N and greater than 0.

In a possible design, a value of N is related to the pressure sensing value. A value range of the pressure sensing value may be 0 to $2^N$. Assuming that a quantity of electrode signals sent by TX1 in one periodicity is N, and N bits of two-stage data corresponding to electrode signals sent by TX2 in one periodicity are used to indicate a pressure sensing value, a maximum of $2^N$ pressure sensing values can be represented. That is, when N is larger, a value range of a pressure sensing value that can be represented is larger and a granularity is smaller. For example, if N is equal to 10, $2^{10}$, that is, 1024 pressure sensing values can be represented. If N is equal to 11, $2^{11}$, that is, 2048 pressure sensing values can be represented.

Alternatively, the value range of the pressure sensing value may be 0 to $2^{N-Q}$. Assuming that a quantity of electrode signals sent by TX1 in one periodicity is N, and N-Q bits of two-stage data corresponding to electrode signals sent by TX2 in one periodicity are used to indicate a pressure sensing value, a maximum of $2^{N-Q}$ pressure sensing values can be represented. When N is larger and Q is smaller, a value range of a pressure sensing value that can be represented is larger and a granularity is smaller.

Figure 11:
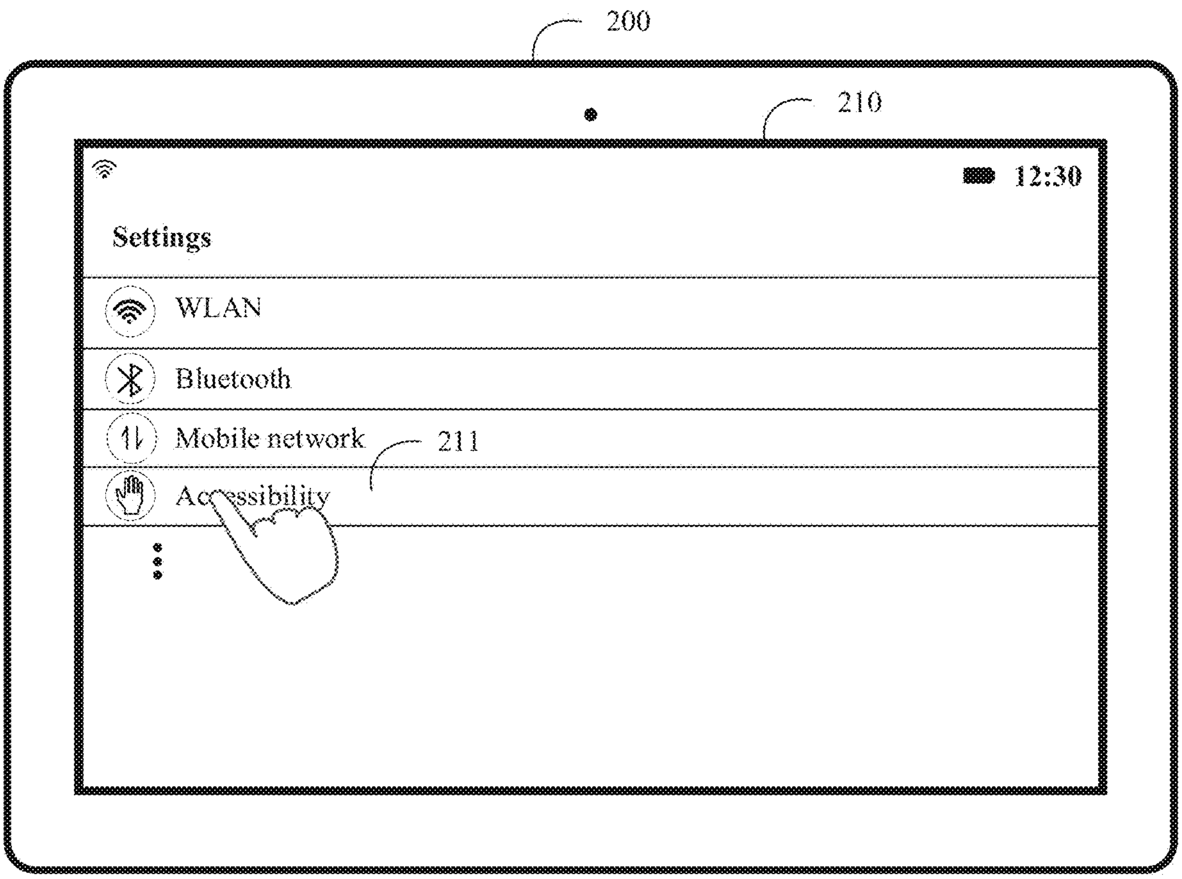
FIG. 11 is a schematic diagram of display according to an embodiment of this application.
Figure 12:
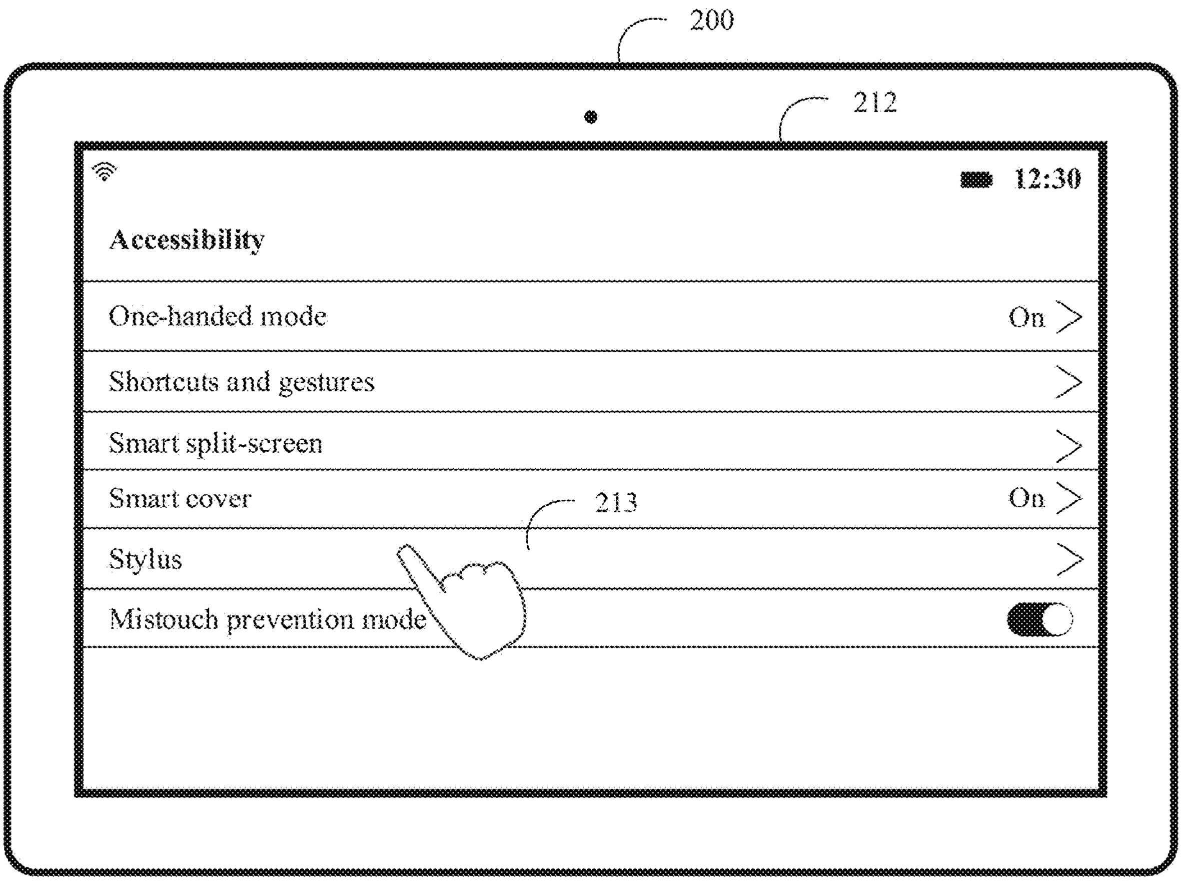
FIG. 12 is another schematic diagram of display according to an embodiment of this application.

Optionally, a user may set a pressure sensing level of the stylus. For example, as shown in FIG. 11 and FIG. 12, in response to an operation of selecting an accessibility option 211 in a setting interface 210 of the electronic device 200 by the user, the electronic device may display an accessibility interface 212. The accessibility interface 212 may include a stylus option 213. Certainly, the accessibility interface 212 may further include other accessibility features, such as a one-handed mode, shortcuts and gestures, smart split-screen, a smart cover mode, a mistouch prevention mode, and the like. This is not limited in this application.

Figure 13:
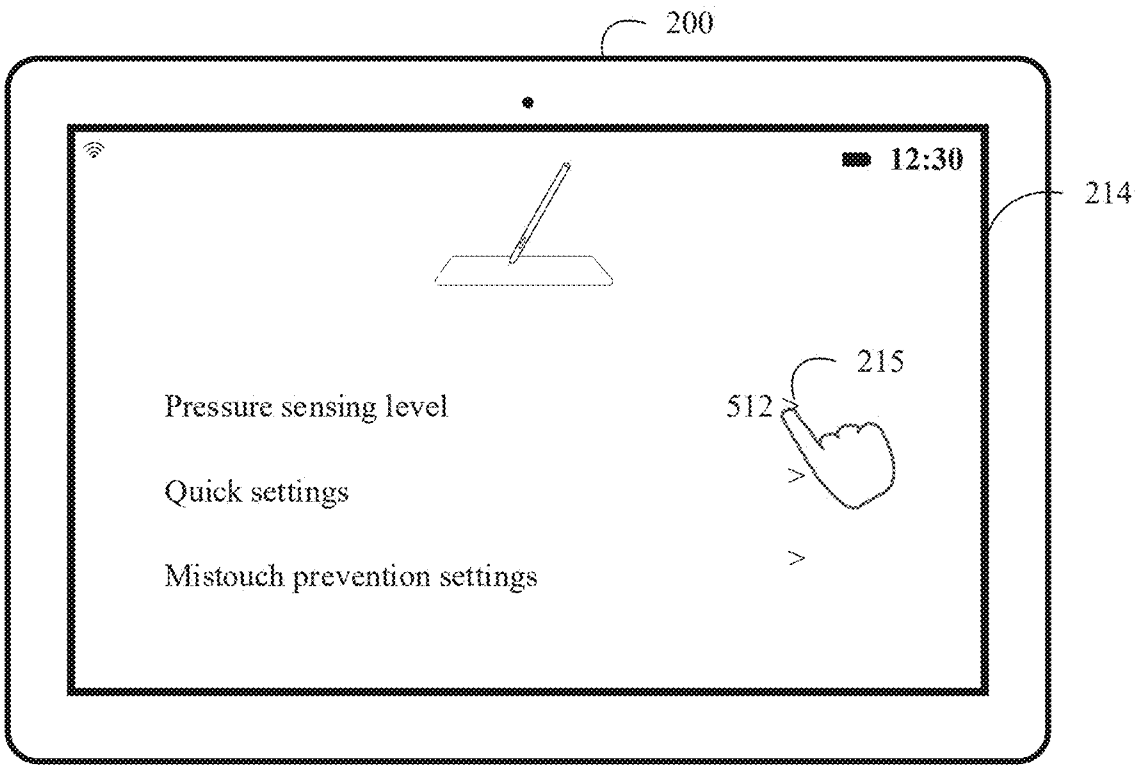
FIG. 13 is another schematic diagram of display according to an embodiment of this application.
Figure 13:
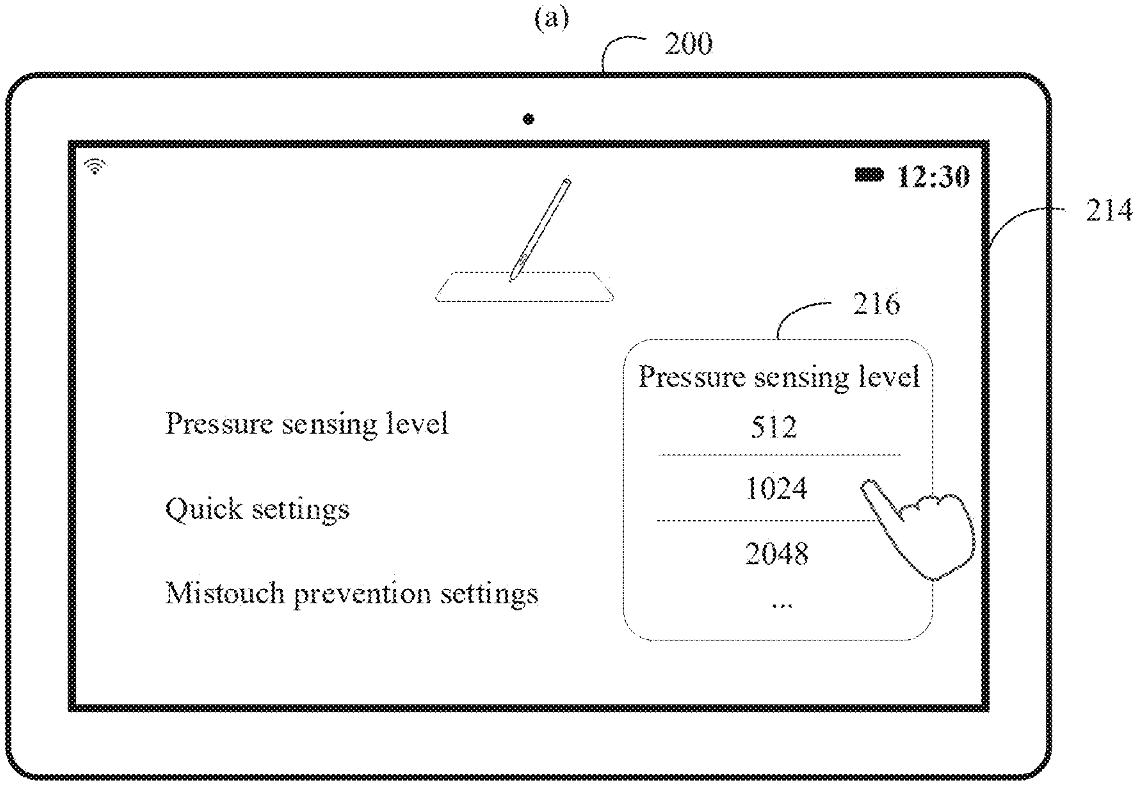

In a possible design, in response to an operation of selecting the stylus option 213 by the user, the electronic device may display a stylus function setting interface 214, as shown in (a) in FIG. 13. The stylus function setting interface 214 includes a pressure sensing level option 215. Certainly, the stylus function setting interface 214 may further include options such as quick settings and mistouch prevention settings. This is not limited in this application. The pressure sensing level may be 512 by default, that is, the range of the pressure sensing value is 0 to 512. In response to an operation of tapping the pressure sensing level option 215 by the user, the electronic device may display a pop-up box 216, as shown in (b) in FIG. 13. The pop-up box 216 may include numerical values of a plurality of pressure sensing levels, for example, may include 512, 1024, 2048, and the like. In response to an operation of selecting 1024 by the user, the electronic device may set the pressure sensing level of the stylus to 1024. In this case, the range of the pressure sensing value is 0 to 1024.

Figure 14:
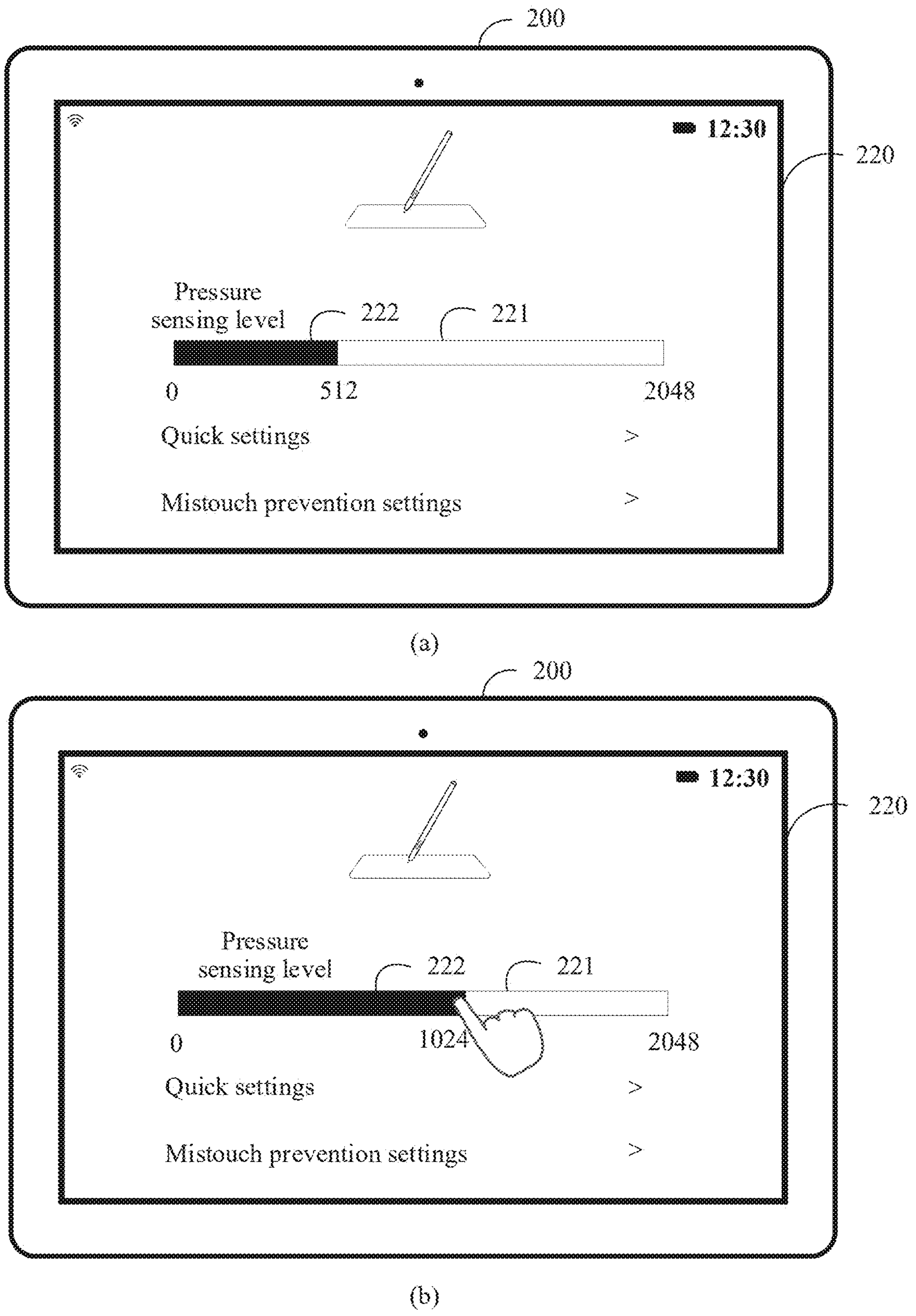
FIG. 14 is another schematic diagram of display according to an embodiment of this application.

In another possible design, in response to an operation of selecting the stylus option 213 by the user, the electronic device may display a stylus function setting interface 220, as shown in (a) in FIG. 14. The stylus function setting interface 220 includes a numerical value adjustment box 221 and a numerical value adjustment button 222 that correspond to a pressure sensing level. As shown in (b) in FIG. 14, in response to an operation performed by the user on the numerical value adjustment button 222 (for example, sliding the numerical value adjustment button 222 rightward to 1024), the numerical value adjustment button 222 may move rightward to 1024, and the electronic device may set the pressure sensing level of the stylus to 1024. In this case, the range of the pressure sensing value is 0 to 1024.

Certainly, a UI interface used for adjusting the pressure sensing value may alternatively be in another form (for example, in a form of numerical value selection box). This is not limited in this application.

904: The electronic device determines a thickness of a line based on the pressure sensing value.

The electronic device determines, based on the pressure sensing value, a thickness of a line (that is, a writing track of the stylus) drawn by the user using the stylus. When the pressure sensing value is larger, the line is thicker, and when the pressure sensing value is smaller, the line is thinner.

Figure 15:
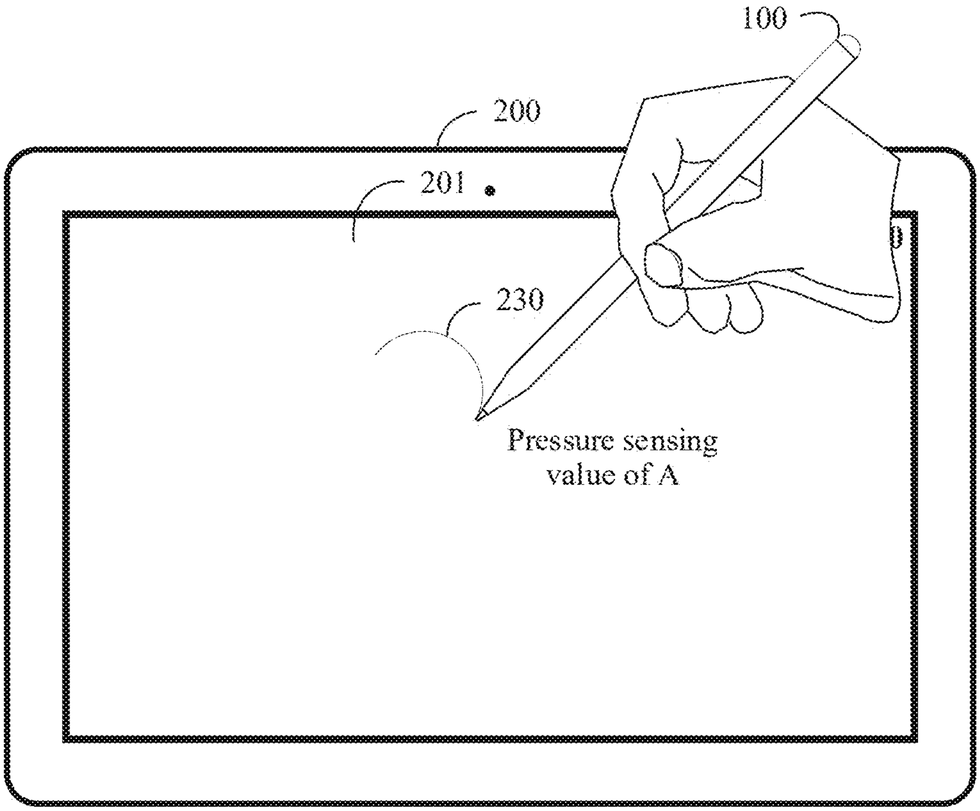
FIG. 15 is another schematic diagram of display according to an embodiment of this application.
Figure 15:
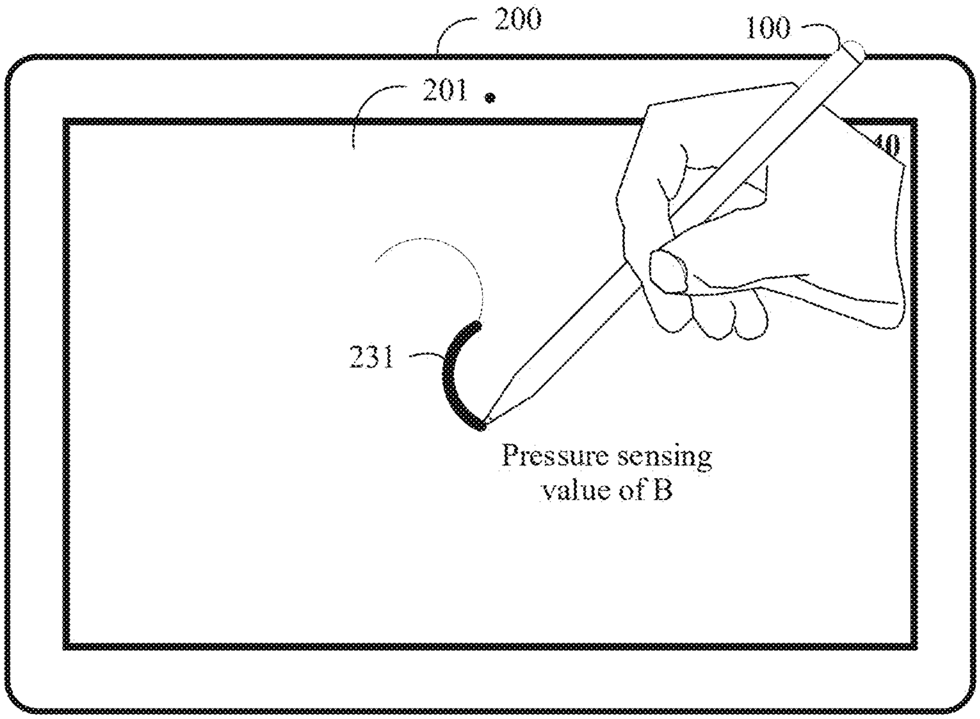

For example, as shown in (a) in FIG. 15, when the pressure sensing value is A, a drawn line 230 is thinner (thinner than a line 231), and as shown in (b) in FIG. 15, when the pressure sensing value is B, the drawn line 231 is thicker (thicker than the line 230), where A is less than B.

According to the method provided in this embodiment of this application, the time sequence of the electrode signals sent by TX1 of the stylus may be used as a reference to change the time sequence of the electrode signals of TX2 of the stylus, to transmit the pressure sensing value through the existence or absence of the electrode signals sent by TX2. In this way, the pressure sensing value can be transmitted to the electronic device when the stylus has no Bluetooth module and device complexity is not increased, making transmission of the pressure sensing value more convenient and simpler.

Figure 16:
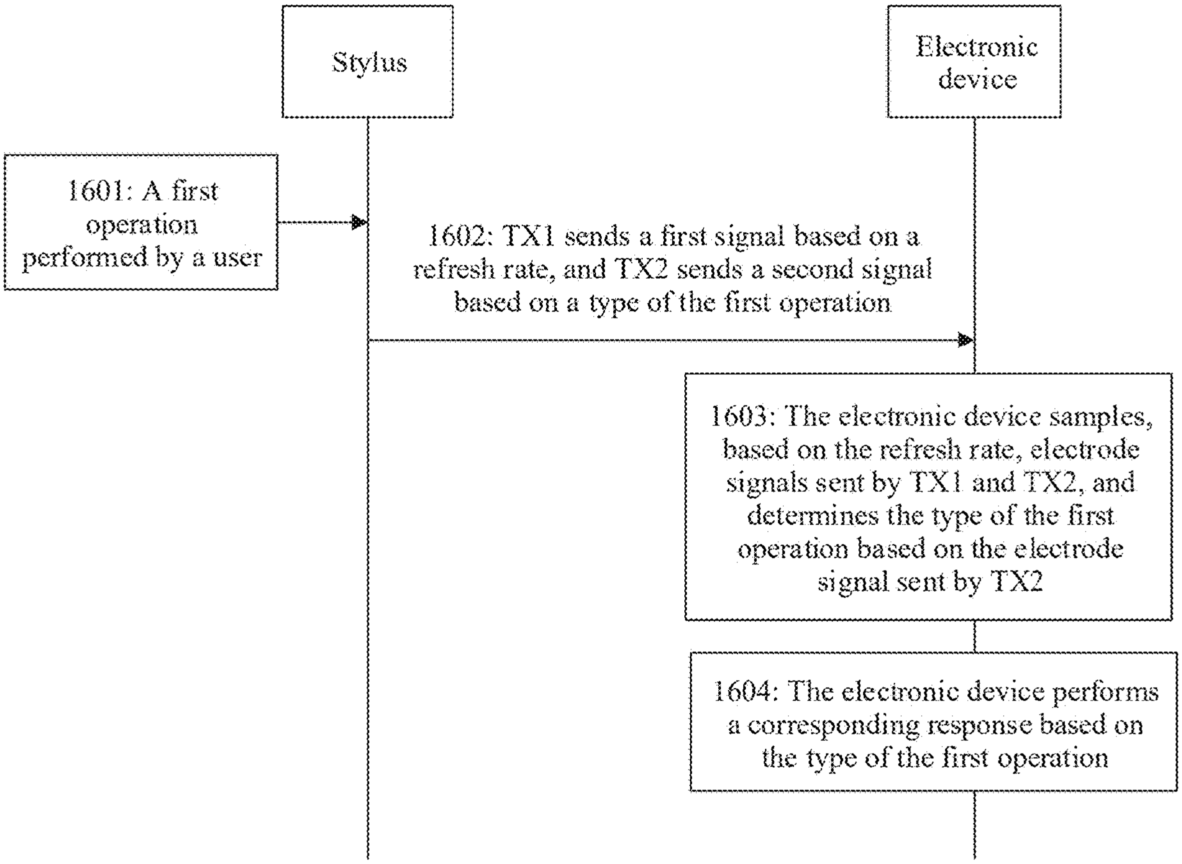
FIG. 16 is another schematic diagram of signal interaction according to an embodiment of this application.

FIG. 16 is a schematic flowchart of another embodiment of an information transmission method according to an embodiment of this application. As shown in FIG. 16, the information transmission method may include the following steps.

1601: A stylus receives a first operation performed by a user.

The first operation (that is, an operation performed by the user) may include a plurality of types. For example, the type of the first operation may include an operation performed on a button on a pen body (for example, single-tapping, double-tapping, or long-pressing), or an operation performed on a touch area on the pen body (for example, tapping or sliding). Certainly, the first operation may further include other types, which are not listed one by one herein.

The stylus may include a button, the button may include a mechanical button and a non-mechanical button, and the button may be configured to collect button press information (for example, single-tapping, double-tapping, or long-pressing) from the user. The stylus may further include a touch sensor, and the touch sensor may be configured to collect touch information (for example, tapping or sliding) from the user.

During operation of the stylus, software run on a processor may process a touch sensor input and a button input, to monitor a user input to the stylus.

1602: TX1 sends a first signal based on a refresh rate, and TX2 sends a second signal based on the type of the first operation.

TX1 may send N downlink signals within a periodicity of one uplink signal based on a refresh rate of an electronic device. For example, the refresh rate of the electronic device is 60 Hz, and that TX1 sends the first signal based on 60 Hz means that TX1 sends N first signals to the electronic device within 16.6 ms after receiving an uplink signal from the electronic device.

TX2 may send M second signals within the periodicity of one uplink signal based on the refresh rate of the electronic device, where M is related to the type of the first operation.

In this embodiment of this application, a time sequence of the electrode signals sent by TX1 of the stylus may be used as a reference to change a time sequence of the electrode signals of TX2 of the stylus, to transmit the type of the first operation through existence or absence of the electrode signals sent by TX2.

In a possible design, an MCU in the stylus may trigger TX1 and TX2 to send electrode signals. For example, as shown in FIG. 5, the MCU in the stylus may send a first PWM signal to a transmit driving circuit based on a preset configuration file (preconfigured a, b, c, and N) (that is, a quantity and a time sequence of first PWM signals may be determined based on preconfigured a, b, c, and N), and send a second PWM signal to the transmit driving circuit based on the type of the first operation (that is, a quantity and a time sequence of second PWM signals may be determined based on the type of the first operation). The transmit driving circuit may drive, based on the first PWM signal, the first electrode to send a first signal, and drive, based on the second PWM signal, the second electrode to send a second signal. For example, TX1 may send N electrode signals within a periodicity of each uplink signal based on the first PWM signal. TX2 may send M electrode signals within the periodicity of each uplink signal based on the second PWM signal.

1603: The electronic device samples, based on the refresh rate, electrode signals sent by TX1 and TX2, and determines the type of the first operation based on the electrode signal sent by TX2.

The electronic device may sample, within the periodicity of one uplink signal based on the refresh rate of the electronic device, the electrode signals sent by TX1 and TX2. For example, the refresh rate of the electronic device is 60 Hz, and that the electronic device samples, based on 60 Hz, the electrode signals sent by TX1 and TX2 means that within 16.6 ms after the electronic device sends the uplink signal to the stylus, the electronic device performs scanning on the electrode signals sent by TX1 and TX2. If the electrode signal of TX1 exists but the electrode signal of TX2 does not exist at a first moment, the electrode signal corresponding to TX2 at the first moment is marked as 0; and if the electrode signal of TX1 exists and the electrode signal of TX2 exists at a second moment, the electrode signal corresponding to TX2 at the second moment is marked as 1. Alternatively, if the electrode signal of TX1 exists but the electrode signal of TX2 does not exist at the first moment, the electrode signal corresponding to TX2 at the first moment is marked as 1; and if the electrode signal of TX1 exists and the electrode signal of TX2 exists at the second moment, the electrode signal corresponding to TX2 at the second moment is marked as 0. The electronic device may obtain a set of binary data (target coding data) according to marking performed on the electrode signals of TX2 within the periodicity of one uplink signal. N bits or N-Q bits of the binary data may be used to represent the type of the first operation performed on the stylus.

For example, decimal data and binary data corresponding to the type of the first operation may be shown in Table 1.

TABLE 1

| Type of the first operation | Numerical value (decimal) | Numerical value (binary) |
|---|---|---|
| Single-tapping the button | 5 | 101 |
| Double-tapping the button | 15 | 111 |
| Long-pressing the button | 25 | 11001 |
| Tapping the touch area | 35 | 100011 |
| Sliding in the touch area | 45 | 101101 |

Certainly, the stylus may include a plurality of buttons. For example, the stylus may include a button 1 and a button 2. Single-tapping/Double-tapping/Long-pressing different buttons belongs to different operation types and corresponds to different binary/decimal data, as shown in Table 2.

TABLE 2

| Type of the first operation | Numerical value (decimal) | Numerical value (binary) |
|---|---|---|
| Single-tapping the button 1 | 5 | 101 |
| Double-tapping the button 1 | 15 | 111 |
| Long-pressing the button 1 | 25 | 11001 |
| Single-tapping the button 2 | 55 | 110111 |
| Double-tapping the button 2 | 65 | 1000001 |
| Long-pressing the button 2 | 75 | 1001011 |
| Tapping the touch area | 35 | 100011 |
| Sliding in the touch area | 45 | 101101 |

Figure 17:
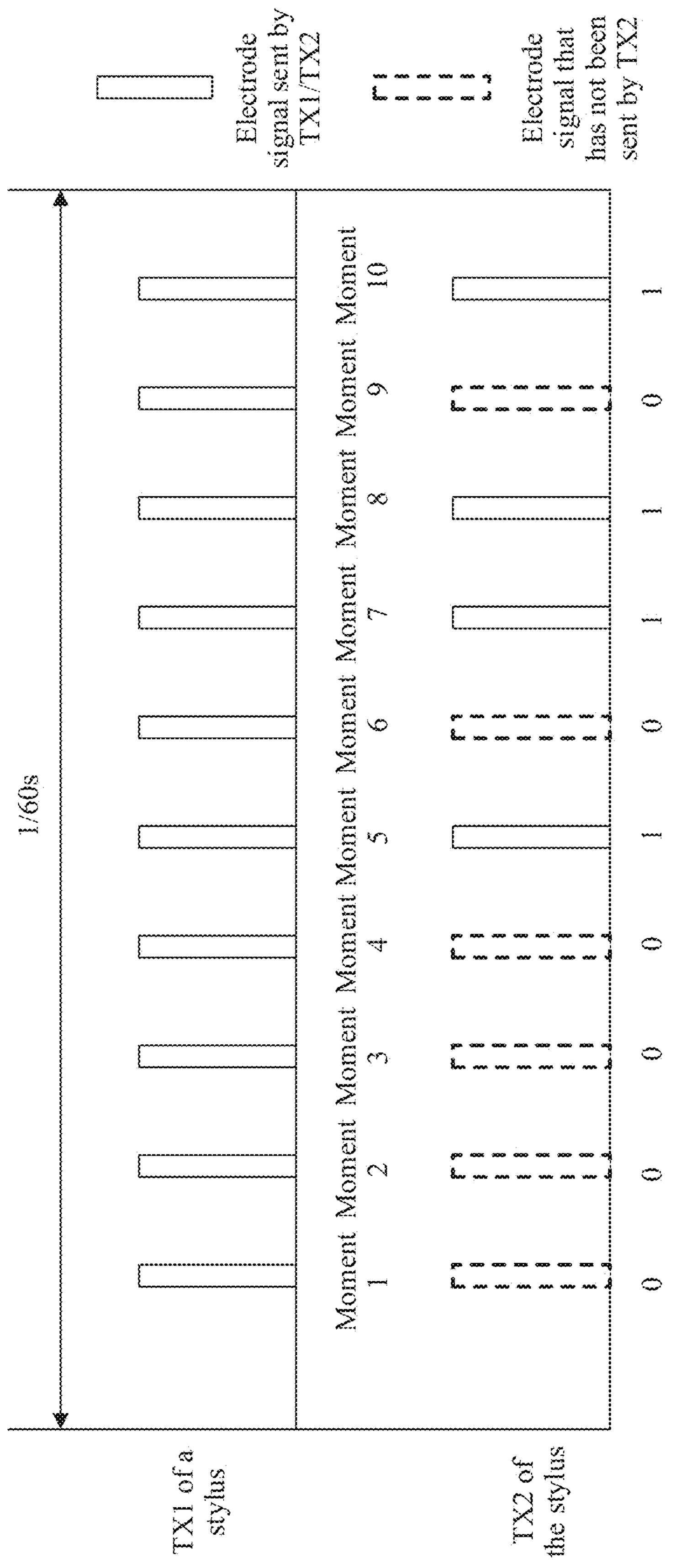
FIG. 17 is another schematic diagram of a signal transmit time sequence according to an embodiment of this application.

For example, as shown in FIG. 17, TX2 sends electrode signals (second signals) only at a moment 5, a moment 7, a moment 8, and a moment 10. The electronic device performs scanning based on a time sequence of electrode signals sent by TX1. If it is determined that a pulse of TX2 at a moment 1 does not exist, the pulse is marked as 0; if a pulse at a moment 2 does not exist, the pulse is marked as 0; if a pulse at a moment 3 does not exist, the pulse is marked as 0; if a pulse at a moment 4 does not exist, the pulse is marked as 0; if a pulse at the moment 5 exists, the pulse is marked as 1; if a pulse at a moment 6 does not exist, the pulse is marked as 0; if a pulse at the moment 7 exists, the pulse is marked as 1; if a pulse at the moment 8 exists, the pulse is marked as 1; if a pulse at a moment 9 does not exist, the pulse is marked as 0; and if a pulse at the moment 10 exists, the pulse is marked as 1. Finally, the electronic device may determine a set of binary data 0000101101 including N bits (that is, 10 bits) based on existence or absence of the electrode signals of TX2 at the 10 moments. The electronic device may store a mapping relationship as shown in Table 1 or Table 2, and determine, based on 0000101101 according to the mapping relationship as shown in Table 1 or Table 2, that the type of the first operation is sliding in the touch area.

In addition, the electronic device may alternatively determine the type of the first operation based on partial data of the determined N-bit binary data. For example, the type of the first operation is determined based on N-Q bits of data. The N-Q bits of data may be first N-Q bits, last N-Q bits, or intermediate N-Q bits of the N-bit binary data. This is not limited in this application. For example, it is determined based on last 3 bits of the binary data 0000101101 that the type of the first operation is single-tapping the button 1. Q is an integer less than N and greater than 0.

1604: The electronic device performs a corresponding response based on the type of the first operation.

The electronic device performs the corresponding response based on the type of the first operation. For example, when the type of the first operation is single-tapping the button, the electronic device may take a screenshot; when the type of the first operation is long-pressing the button, the electronic device may start a notepad application; or when the type of the first operation is sliding in the touch area, the electronic device may switch an interface. Certainly, the electronic device may perform a response of other types based on the type of the first operation, which are not listed one by one herein.

According to the method provided in this embodiment of this application, the time sequence of the electrode signals sent by TX1 of the stylus may be used as a reference to change the time sequence of the electrode signals of TX2 of the stylus, to transmit the type of the first operation through the existence or absence of the electrode signals sent by TX2. In this way, the type of the first operation received by the stylus can be transmitted to the electronic device when the stylus has no Bluetooth module and device complexity is not increased, so that the electronic device can respond based on the type of the first operation. This reduces costs and makes information transmission between the stylus and the electronic device more convenient and simpler.

Figure 18:
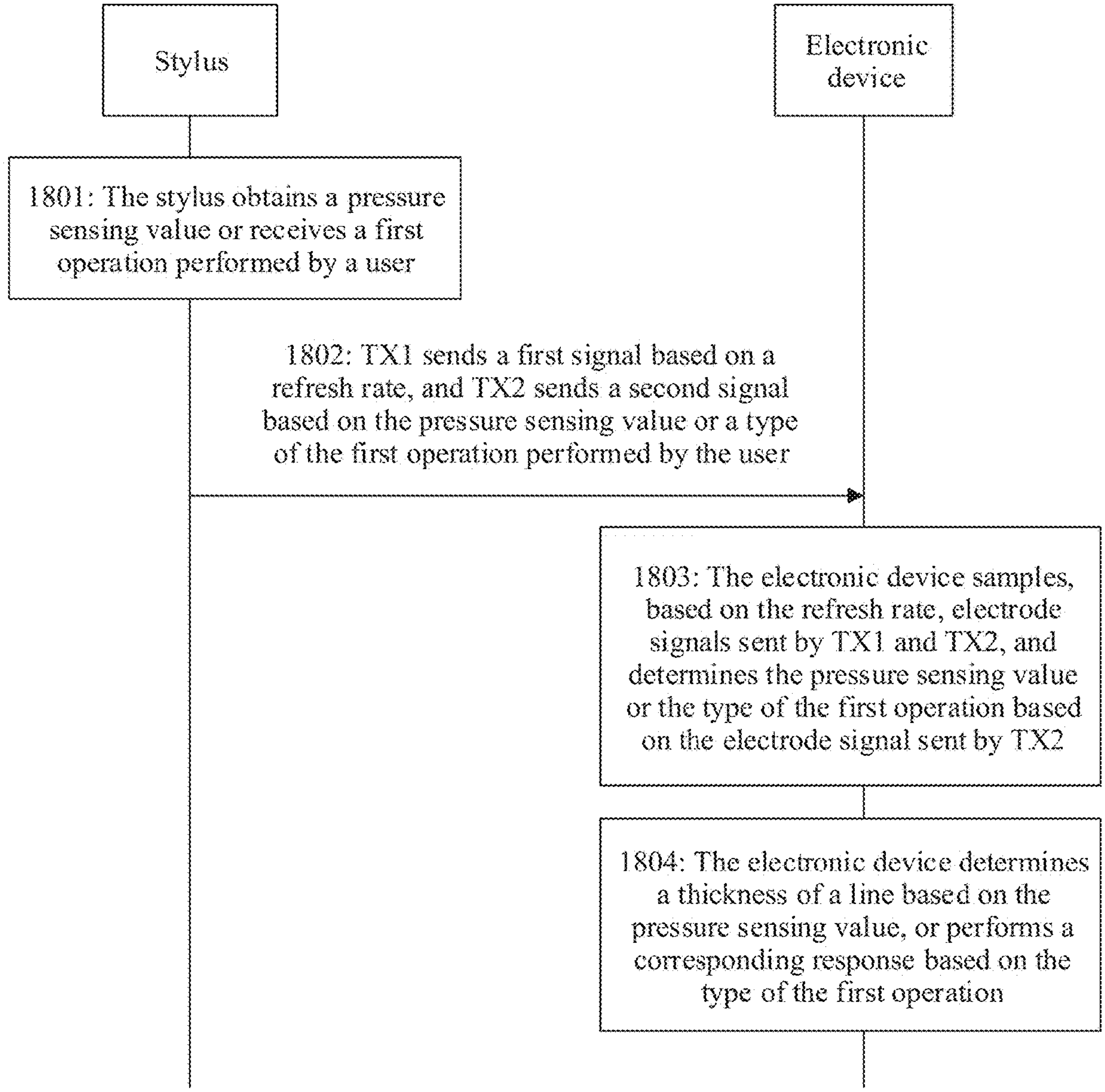
FIG. 18 is another schematic diagram of signal interaction according to an embodiment of this application.

FIG. 18 is a schematic flowchart of another embodiment of an information transmission method according to an embodiment of this application. As shown in FIG. 18, the information transmission method may include the following steps.

1801: A stylus obtains a pressure sensing value or receives a first operation performed by a user.

For a process in which the stylus obtains the pressure sensing value, refer to the descriptions in step 901. For a process in which the stylus receives the first operation performed by the user, refer to the descriptions in step 1601. Details are not described herein again.

1802: TX1 sends a first signal based on a refresh rate, and TX2 sends a second signal based on the pressure sensing value or a type of the first operation performed by the user.

TX1 may send N downlink signals within a periodicity of one uplink signal based on a refresh rate of an electronic device. For example, the refresh rate of the electronic device is 60 Hz, and that TX1 sends the first signal based on 60 Hz means that TX1 sends N first signals to the electronic device within 16.6 ms after receiving an uplink signal from the electronic device.

TX2 may send M second signals within the periodicity of one uplink signal based on the refresh rate of the electronic device, where M is related to the pressure sensing value or the type of the first operation performed by the user.

It should be noted that, to identify whether the second signals sent by TX2 are used to indicate the pressure sensing value or the first operation performed by the user, a type of information indicated by the second signals may be indicated by a value of first P bits of binary data corresponding to the electrode signals sent by TX2 within the periodicity of one uplink signal. That is, whether the second signals are used to indicate the pressure sensing value or the first operation performed by the user may be determined based on the value of the first P bits of the binary data corresponding to the second signals sent by TX2 within the periodicity of one uplink signal, and a specific value of the pressure sensing value or the type of the first operation is determined based on data after the first P bits of the binary data. P is preset and may be, for example, 1, 2, or 3. For example, if P is 2, when the value of the first P bits is 01, last N-P bits of the binary data may be used to indicate the pressure sensing value, or when the value of the first P bits is 10, the last N-P bits of the binary data may be used to indicate the type of the first operation performed by the user.

1803: The electronic device samples, based on the refresh rate, electrode signals sent by TX1 and TX2, and determines the pressure sensing value or the type of the first operation based on the electrode signal sent by TX2.

The electronic device may sample, within the periodicity of one uplink signal based on the refresh rate of the electronic device, the electrode signals sent by TX1 and TX2. For example, the refresh rate of the electronic device is 60 Hz, and that the electronic device samples, based on 60 Hz, the electrode signals sent by TX1 and TX2 means that within 16.6 ms after the electronic device sends the uplink signal to the stylus, the electronic device performs scanning on the electrode signals sent by TX1 and TX2. If the electrode signal of TX1 exists but the electrode signal of TX2 does not exist at a first moment, the electrode signal corresponding to TX2 at the first moment is marked as 0; and if the electrode signal of TX1 exists and the electrode signal of TX2 exists at a second moment, the electrode signal corresponding to TX2 at the second moment is marked as 1. The electronic device may obtain a set of binary data according to marking performed on the electrode signals of TX2 within the periodicity of one uplink signal. The binary data may be used to represent the pressure sensing value of the stylus or the type of the first operation.

For example, if P is 2, when a value of first P bits is 01, the second signals sent by TX2 are used to indicate the pressure sensing value, or when the value of the first P bits is 10, the second signals sent by TX2 are used to indicate the first operation performed by the user.

Figure 19:
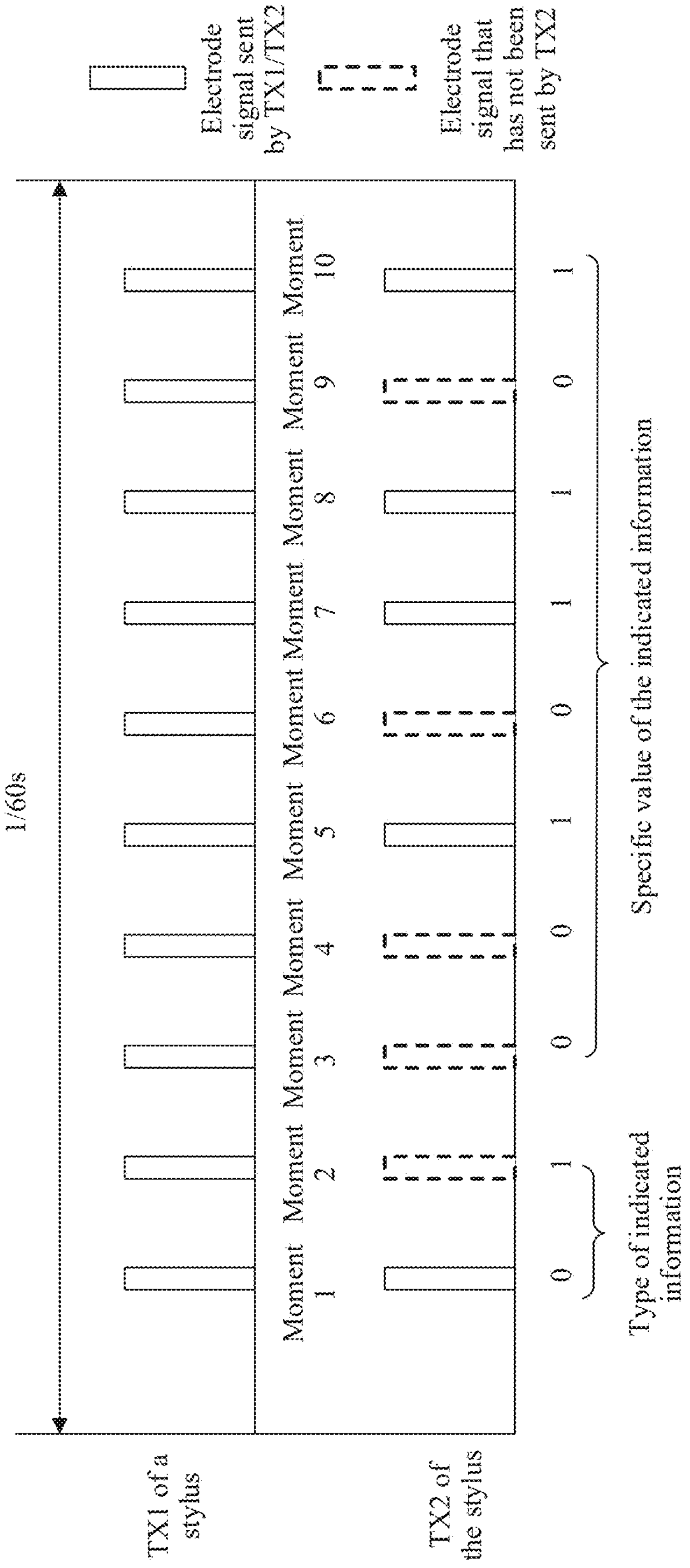
FIG. 19 is a schematic diagram of a signal transmit time sequence according to an embodiment of this application.

As shown in FIG. 19, TX1 sends first signals at a moment 1 to a moment 10, and TX2 sends second signals only at the moment 1, the moment 5, the moment 7, the moment 8, and the moment 10. The electronic device performs scanning based on a time sequence of the electrode signals sent by TX1. If it is determined that a pulse of TX2 at the moment 1 exists, the pulse is marked as 1; if a pulse at the moment 2 does not exist, the pulse is marked as 0; if a pulse at the moment 3 does not exist, the pulse is marked as 0; if a pulse at the moment 4 does not exist, the pulse is marked as 0; if a pulse at the moment 5 exists, the pulse is marked as 1; if a pulse at the moment 6 does not exist, the pulse is marked as 0; if a pulse at the moment 7 exists, the pulse is marked as 1; if a pulse at the moment 8 exists, the pulse is marked as 1; if a pulse at the moment 9 does not exist, the pulse is marked as 0; and if a pulse at the moment 10 exists, the pulse is marked as 1. Finally, the electronic device may determine a set of binary data 1000101101 based on existence or absence of the electrode signals of TX2, determine, based on first P bits (for example, the first 2 bits) of 1000101101, that the second signals sent by TX2 are used to indicate the first operation performed by the user, and determine, based on values (00101101) after the first 2 bits, that the type of the first operation is sliding in a touch area.

Figure 20:
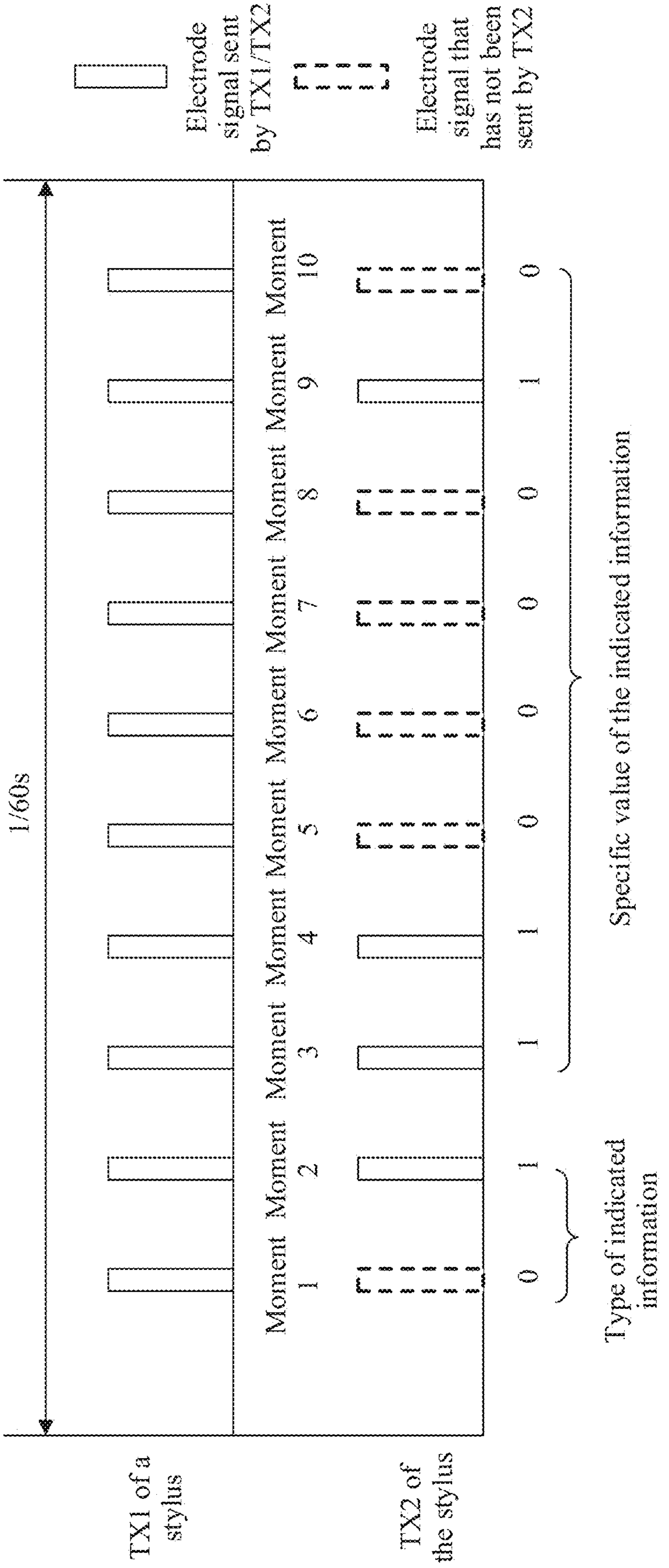
FIG. 20 is a schematic diagram of a signal transmit time sequence according to an embodiment of this application.

As shown in FIG. 20, TX1 sends first signals at a moment 1 to a moment 10, and TX2 sends second signals only at the moment 2, the moment 3, the moment 4, and the moment 9. The electronic device performs scanning based on a time sequence of the electrode signals sent by TX1. If it is determined that a pulse of TX2 at the moment 1 does not exist, the pulse is marked as 0; if a pulse at the moment 2 exists, the pulse is marked as 1; if a pulse at the moment 3 exists, the pulse is marked as 1; if a pulse at the moment 4 exists, the pulse is marked as 1; if a pulse at the moment 5 does not exist, the pulse is marked as 0; if a pulse at the moment 6 does not exist, the pulse is marked as 0; if a pulse at the moment 7 does not exist, the pulse is marked as 0; if a pulse at the moment 8 does not exist, the pulse is marked as 0; if a pulse at the moment 9 exists, the pulse is marked as 1; and if a pulse at the moment 10 does not exist, the pulse is marked as 0. Finally, the electronic device may determine a set of binary data 01 1100 0010 based on existence or absence of the electrode signals of TX2, determine, based on first P bits (for example, the first 2 bits) of 01 1100 0010, that the second signals sent by TX2 are used to indicate the pressure sensing value, and determine, based on values (1100 0010) after the first 2 bits, that the pressure sensing value is 97.

1804: The electronic device determines a thickness of a line based on the pressure sensing value, or performs a corresponding response based on the type of the first operation.

For a process in which the electronic device determines the thickness of the line based on the pressure sensing value, refer to the related descriptions in step 904. For a process in which the electronic device performs the corresponding response based on the type of the first operation, refer to the related descriptions in step 1604. Details are not described herein again.

According to the method provided in this embodiment of this application, the time sequence of the electrode signals sent by TX1 of the stylus may be used as a reference to change a time sequence of the electrode signals of TX2 of the stylus, to transmit the pressure sensing value or the type of the first operation through the existence or absence of the electrode signals sent by TX2. In this way, the pressure sensing value of the stylus or the type of the first operation received by the stylus can be transmitted to the electronic device when the stylus has no Bluetooth module and device complexity is not increased, so that the electronic device can respond based on the pressure sensing value or the type of the first operation. This reduces costs and makes information transmission between the stylus and the electronic device more convenient and simpler.

Figure 21:
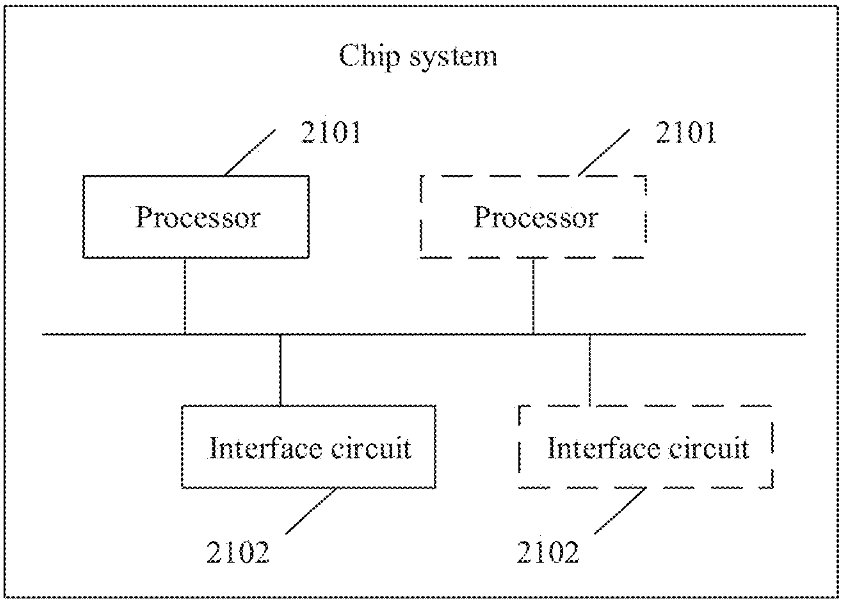
FIG. 21 is a schematic diagram of a structure of a chip system according to an embodiment of this application.

An embodiment of this application further provides a chip system. As shown in FIG. 21, the chip system includes at least one processor 2101 and at least one interface circuit 2102. The processor 2101 and the interface circuit 2102 may be connected to each other by using a line. For example, the interface circuit 2102 may be configured to receive a signal from another apparatus (for example, a memory of an electronic device). For another example, the interface circuit 2102 may be configured to send a signal to another apparatus (for example, the processor 2101).

For example, the interface circuit 2102 may read instructions stored in a memory of an electronic device and send the instructions to the processor 2101. When the instructions are executed by the processor 2101, the electronic device (the electronic device 200 shown in FIG. 4) or a stylus (the stylus 100 shown in FIG. 3) may be enabled to perform the steps in the foregoing embodiments.

Certainly, the chip system may further include another discrete device. This is not specifically limited in embodiments of this application.

An embodiment of this application further provides a computer-readable storage medium. The computer-readable storage medium includes computer instructions. When the computer instructions are run on an electronic device (the electronic device 200 shown in FIG. 4) or a stylus (the stylus 100 shown in FIG. 3), the electronic device 200 is enabled to perform functions or steps performed by the electronic device in the foregoing method embodiments, and the stylus 100 is enabled to perform functions or steps performed by the stylus in the foregoing method embodiments.

An embodiment of this application further provides a computer program product. When the computer program product is run on a computer, the computer is enabled to perform the functions or steps performed by the electronic device in the foregoing method embodiments.

An embodiment of this application further provides a processing apparatus. The processing apparatus may be divided into different logical units or modules according to functions, and each unit or module performs a different function, so that the processing apparatus performs the functions or steps performed by the electronic device or the stylus in the foregoing method embodiments.

It may be clearly understood by a person skilled in the art from the foregoing descriptions of the implementations that, the foregoing functions may be allocated to different functional modules according to a requirement, that is, an internal structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, division into module or unit is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected according to an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of software functional unit.

When the integrated unit is implemented in the form of software functional unit and sold or used as an independent product, the integrated unit may be stored in a readable storage medium. Based on such an understanding, the technical solutions of embodiments of this application essentially, or the part contributing to the prior art, or all or some of the technical solutions may be implemented in a form of software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An information transmission method, applied to a system that includes a stylus and an electronic device, wherein the stylus comprises a first electrode and a second electrode, and the method comprises:

sending, by the first electrode, N first signals based on a refresh rate, wherein the N first signals correspond to N sending moments, and N is an integer greater than or equal to 1;

sending, by the second electrode, M second signals based on a pressure sensing value detected by the stylus or a type of an operation performed by a user on the stylus, wherein the M second signals correspond to M sending moments, the M sending moments overlap some or all of the N sending moments, and M is an integer less than or equal to N;

receiving, by the electronic device, the first signal and the second signal;

at a first moment, based on the electronic device determining that the first signal exists but the second signal does not exist, recording, by the electronic device, a first value;

at a second moment, based on the electronic device determining that the first signal exists and the second signal exists, recording, by the electronic device, a second value, wherein the first moment or the second moment is any moment in the N moments; and obtaining, by the electronic device, target coding data based on the first value and/or the second value recorded at the N moments, wherein the target coding data represents the pressure sensing value or the type of the operation performed by the user on the stylus.

2. The method according to claim 1, wherein the target coding data comprises the first value and/or the second value recorded at all moments of the N moments; or wherein the target coding data comprises the first value and/or the second value recorded at some but less than all moments of the N moments.

3. The method according to claim 1, wherein the first value is 0, and the second value is 1; or wherein the first value is 1, and the second value is 0.

4. The method according to claim 1, wherein the target coding data is binary data, the binary data comprises N bits or N-Q bits, and Q is an integer less than N and greater than 0.

5. The method according to claim 4, wherein a value range of the pressure sensing value is 0 to $2^N$ or 0 to $2^{N-Q}$.

6. The method according to claim 4, wherein based on a value of first P bits of the binary data being a first preset value, last N-P bits of the binary data are used to indicate the pressure sensing value, and P is an integer greater than or equal to 1; or wherein based on the value of the first P bits of the binary data being a second preset value, the last N-P bits of the binary data are used to indicate the type of the operation performed by the user.

7. The method according to claim 4, wherein based on a value of last P bits of the binary data being a first preset value, first N-P bits of the binary data are used to indicate the pressure sensing value, and P is an integer greater than or equal to 1; or wherein based on the value of the last P bits of the binary data being a second preset value, the first N-P bits of the binary data are used to indicate the type of the operation performed by the user.

8. The method according to claim 1, wherein the type of the operation performed by the user on the stylus comprises an operation performed on a button or a touch area of the stylus, and the operation performed on the button or the touch area of the stylus comprises single-tapping, double-tapping, long-pressing, or sliding.

9. The method according to claim 1, wherein based on the target coding data being used to represent the pressure sensing value, the method further comprises:

determining, by the electronic device based on the pressure sensing value, a thickness of a line drawn by the stylus, wherein the thickness of the line corresponds to the pressure sensing values.

10. The method according to claim 1, wherein based on the target coding data being used to represent the type of the operation performed by the user on the stylus, the method further comprises:

taking, by the electronic device, a screenshot based on the type of the operation being single-tapping the button; or starting, by the electronic device, a notepad application based on the type of the operation being long-pressing the button; or switching, by the electronic device, an interface based on the type of the operation being sliding in the touch area.

11. The method according to claim 1, further comprising:

in response to an operation of selecting an accessibility option in a setting interface of the electronic device by the user, displaying, by the electronic device, an accessibility interface, wherein the accessibility interface comprises a stylus option;

in response to an operation of selecting the stylus option by the user, displaying, by the electronic device, a stylus function setting interface, wherein the stylus function setting interface comprises a pressure sensing level option;

in response to an operation performed by the user on the pressure sensing level option, displaying, by the electronic device, a pop-up box, wherein the pop-up box comprises numerical values of a plurality of pressure sensing levels; and in response to an operation of selecting a first numerical value from the numerical values of the plurality of pressure sensing levels by the user, setting, by the electronic device, a pressure sensing level of the stylus based on the first numerical value.

12. The method according to claim 1, further comprising:

in response to an operation of selecting an accessibility option in a setting interface of the electronic device by the user, displaying, by the electronic device, an accessibility interface, wherein the accessibility interface comprises a stylus option;

in response to an operation of selecting the stylus option by the user, displaying, by the electronic device, a stylus function setting interface, wherein the stylus function setting interface comprises a numerical value adjustment box and a numerical value adjustment button that correspond to a pressure sensing level; and in response to an operation of adjusting the numerical value adjustment box to a first numerical value through the numerical value adjustment button by the user, setting, by the electronic device, a pressure sensing level of the stylus based on the first numerical value.

13. An information transmission method, applied to a stylus, wherein the stylus comprises a first electrode and a second electrode, and the method comprises:

sending, by the first electrode, N first signals to an electronic device based on a refresh rate, wherein the N first signals correspond to N sending moments, and N is an integer greater than or equal to 1; and sending, by the second electrode, M second signals to the electronic device based on a pressure sensing value detected by the stylus or a type of an operation performed by a user on the stylus, wherein the M second signals correspond to M sending moments, the M sending moments overlap some or all of the N sending moments, and M is an integer less than or equal to N:

wherein a first moment of the N moments corresponds to a first value, and the first signal exists but the second signal does not exist at the first moment;

wherein a second moment of the N moments corresponds to a second value, and the first signal exists and the second signal exists at the second moment; and wherein the first value and/or the second value corresponding to the N moments are used to construct target coding data, and the target coding data represents the pressure sensing value or the type of the operation performed by the user on the stylus.

14. The method according to claim 13, wherein the target coding data comprises the first value and/or the second value recorded at all moments of the N moments; or wherein the target coding data comprises the first value and/or the second value recorded at some but less than all moments of the N moments.

15. The method according to claim 13, wherein the first value is 0, and the second value is 1; or wherein the first value is 1, and the second value is 0.

16. The method according to claim 13, wherein the target coding data is binary data, the binary data comprises N bits or N-Q bits, and Q is an integer less than N and greater than 0.

17. The method according to claim 16, wherein a value range of the pressure sensing value is 0 to $2^N$ or 0 to $2^{N-Q}$.

18. The method according to claim 16, wherein based on a value of first P bits of the binary data being a first preset value, last N-P bits of the binary data are used to indicate the pressure sensing value, and P is an integer greater than or equal to 1; or wherein based on the value of the first P bits of the binary data being a second preset value, the last N-P bits of the binary data are used to indicate the type of the operation performed by the user.

19. The method according to claim 16, wherein based on a value of last P bits of the binary data being a first preset value, first N-P bits of the binary data are used to indicate the pressure sensing value, and P is an integer greater than or equal to 1; or wherein based on the value of the last P bits of the binary data being a second preset value, the first N-P bits of the binary data are used to indicate the type of the operation performed by the user.

20. The method according to claim 13, wherein the type of the operation performed by the user on the stylus comprises an operation performed on a button or a touch area of the stylus, and the operation performed on the button or the touch area of the stylus comprises single-tapping, double-tapping, long-pressing, or sliding.

* * * * *